US009829686B2

(12) United States Patent
Saito

(10) Patent No.: US 9,829,686 B2
(45) Date of Patent: Nov. 28, 2017

(54) ZOOM LENS AND IMAGING APPARATUS

(71) Applicant: FUJIFILM Corporation, Tokyo (JP)

(72) Inventor: Hiroki Saito, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 291 days.

(21) Appl. No.: 14/645,886

(22) Filed: Mar. 12, 2015

(65) Prior Publication Data

US 2015/0185450 A1 Jul. 2, 2015

Related U.S. Application Data

(63) Continuation of application No. PCT/JP2013/005323, filed on Sep. 9, 2013.

(30) Foreign Application Priority Data

Sep. 14, 2012 (JP) .................................. 2012-202354

(51) Int. Cl.
    *G02B 15/163* (2006.01)
    *G02B 15/173* (2006.01)
    *G02B 27/64* (2006.01)

(52) U.S. Cl.
    CPC ......... *G02B 15/163* (2013.01); *G02B 15/173* (2013.01); *G02B 27/646* (2013.01)

(58) Field of Classification Search
    CPC .................................. G02B 9/60; G02B 9/64
    USPC ....................................................... 359/766
    See application file for complete search history.

(56) References Cited

U.S. PATENT DOCUMENTS

| 6,404,561 | B1 | 6/2002 | Isono et al. |
| 2001/0046383 | A1 | 11/2001 | Hagimori et al. |
| 2008/0304167 | A1 | 12/2008 | Souma |
| 2009/0290228 | A1 | 11/2009 | Yamashita |
| 2011/0019033 | A1 | 1/2011 | Ori et al. |
| 2011/0205636 | A1* | 8/2011 | Ito ..................... G02B 27/646 |
| | | | 359/684 |

FOREIGN PATENT DOCUMENTS

| JP | 2001-194590 | 7/2001 |
| JP | 2001-350093 | 12/2001 |
| JP | 2007-047538 | 2/2007 |
| JP | 2007-093977 | 4/2007 |

(Continued)

OTHER PUBLICATIONS

International Search Report, PCT/JP2013/005323, dated Jan. 28, 2014.

*Primary Examiner* — Kimberly N Kakalec
(74) *Attorney, Agent, or Firm* — Young & Thompson

(57) ABSTRACT

A zoom lens consists of a first lens group having positive refractive power, a second lens group having negative refractive power, a third lens group having positive refractive power, a fourth lens group having negative refractive power, and a fifth lens group having positive refractive power in this order from an object side. The third lens group includes a cemented lens closest to the object side and a cemented lens closest to an image side, and the fourth lens group consists of a negative lens and a positive lens in this order from the object side. Distances between the lens groups change, and the fifth lens group is fixed, and at least the first lens group and the fourth lens group move when magnification is changed from the wide angle end to the telephoto end.

19 Claims, 14 Drawing Sheets

(56) References Cited

FOREIGN PATENT DOCUMENTS

| JP | 2007-093979 | 4/2007 |
| JP | 2008-304706 | 12/2008 |
| JP | 2009-282429 | 12/2009 |
| JP | 2011-186417 | 9/2011 |

* cited by examiner

FIG.8
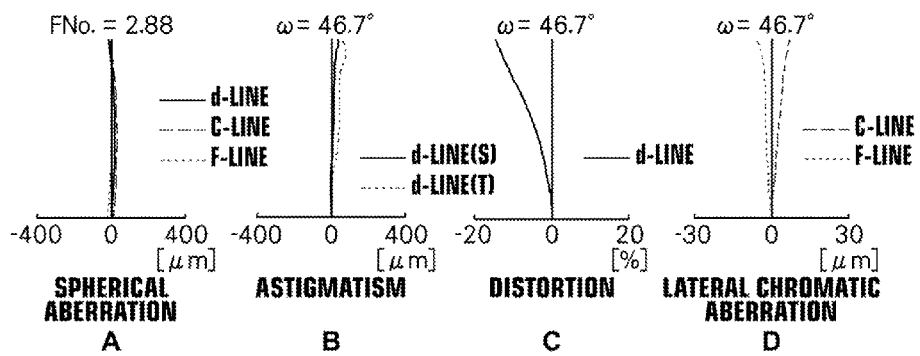
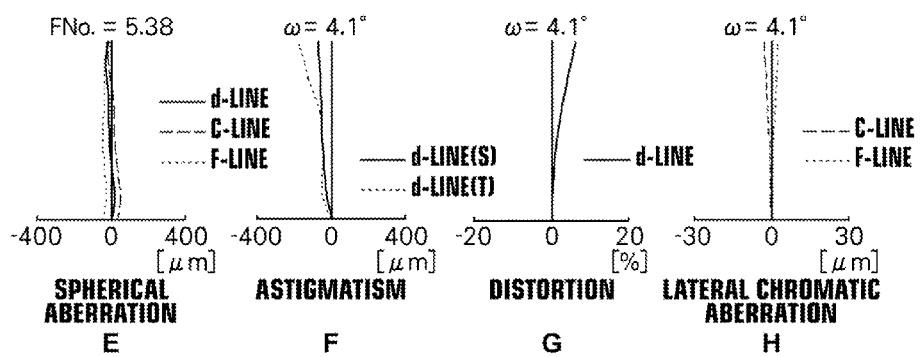
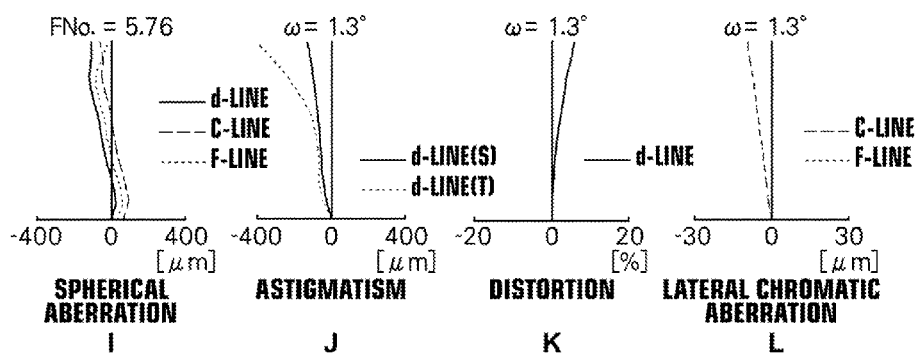

FIG.9
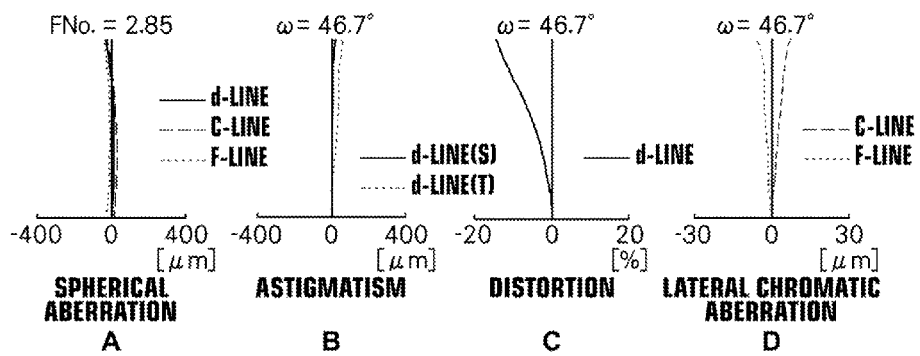
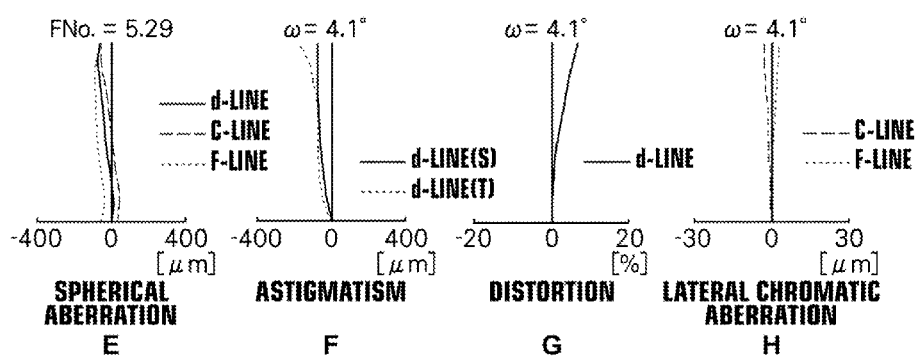
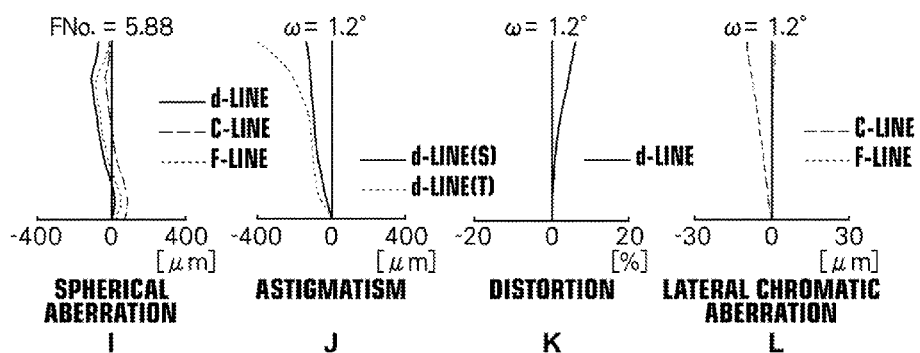

FIG.10
EXAMPLE 3
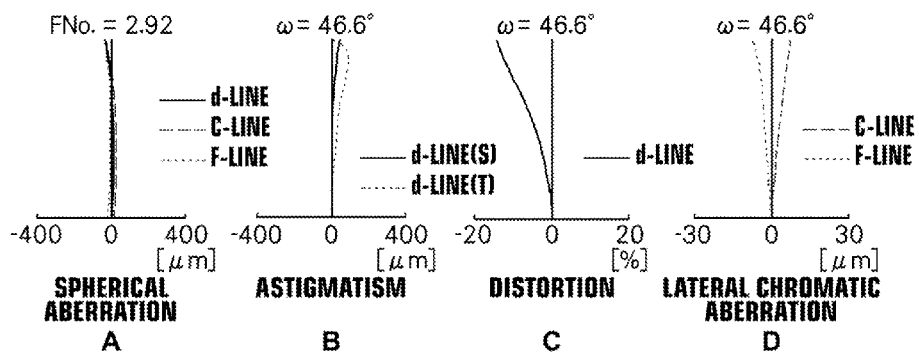
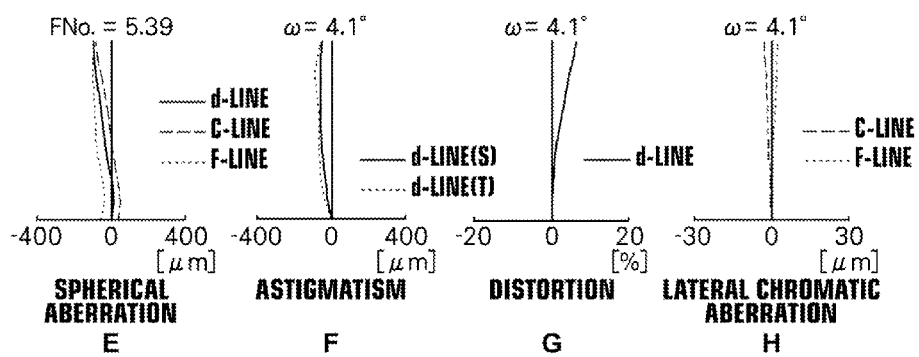
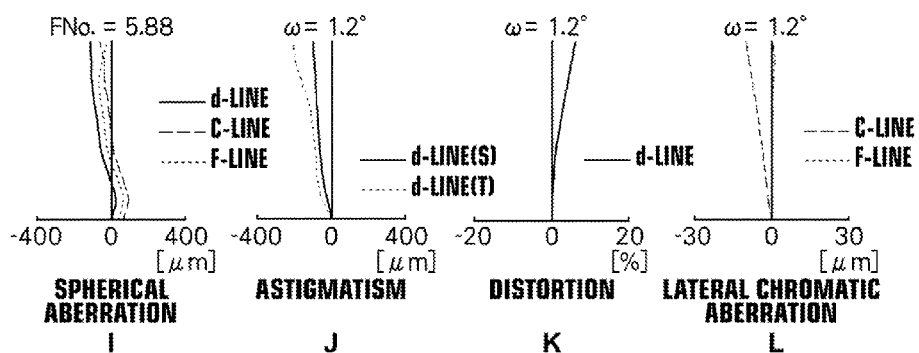

FIG.11
EXAMPLE 4
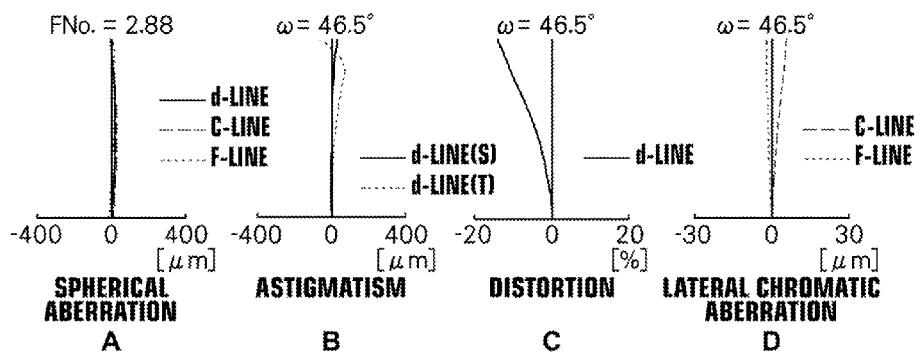
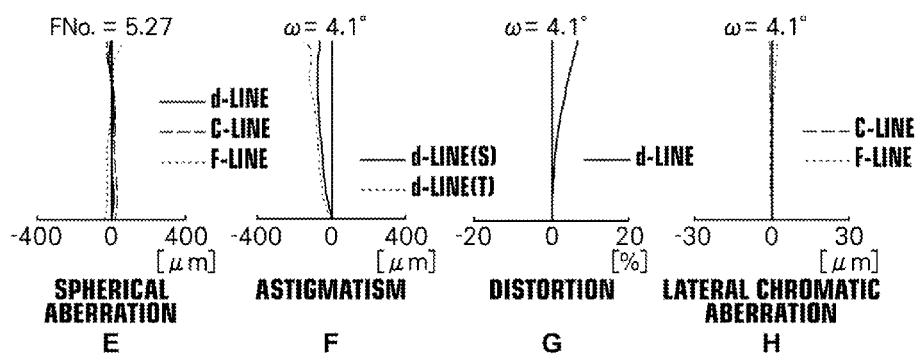
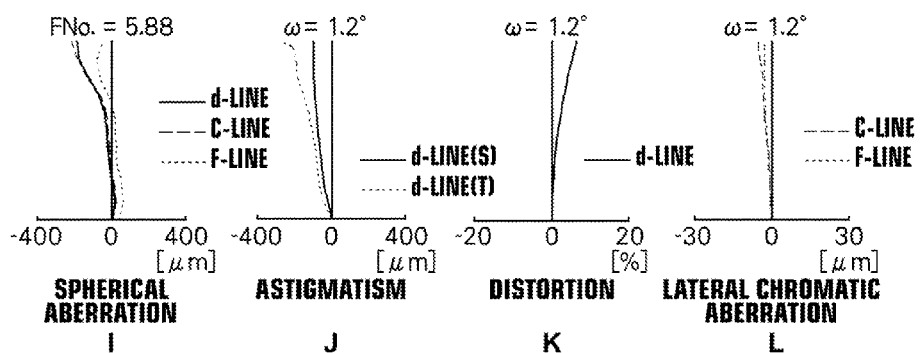

FIG.12
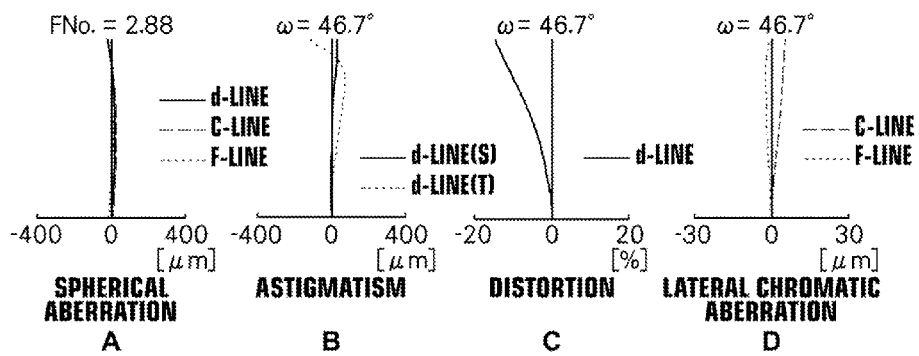
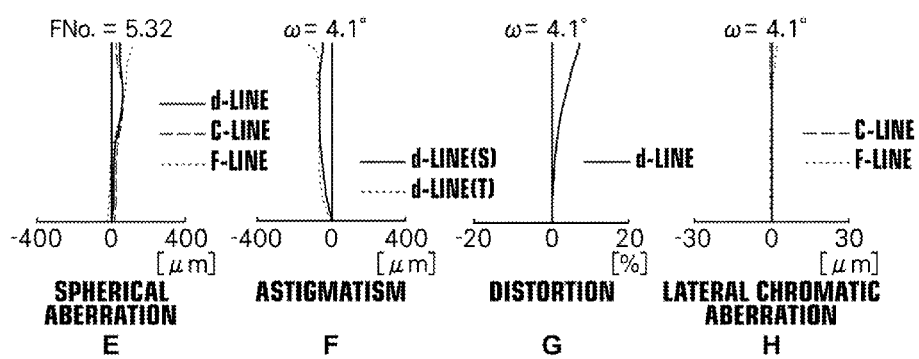
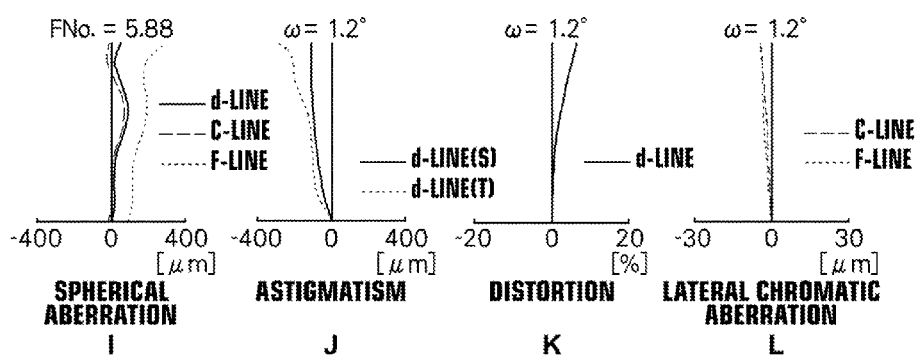

FIG.13
EXAMPLE 6
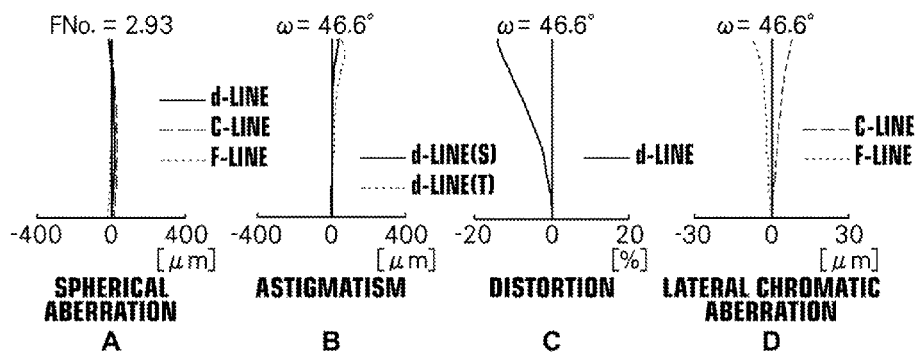
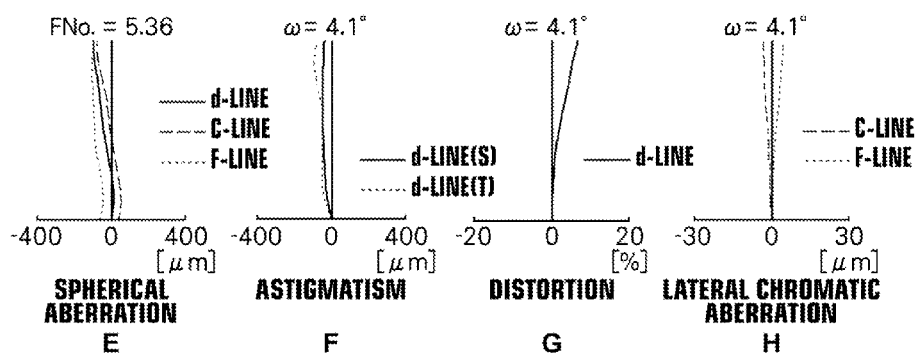
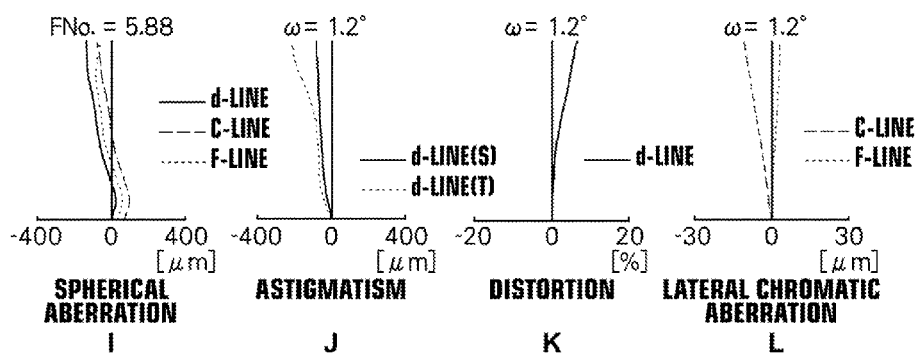

ZOOM LENS AND IMAGING APPARATUS

CROSS-REFERENCE TO RELATED APPLICATIONS

This application is a Continuation of PCT International Application No. PCT/JP2013/005323 filed on Sep. 9, 2013, which claims priority under 35 U.S.C. §119(a) to Japanese Patent Application No. 2012-202354 filed on Sep. 14, 2012. Each of the above applications is hereby expressly incorporated by reference, in its entirety, into the present application.

BACKGROUND OF THE INVENTION

Field of the Invention

The present invention relates to a zoom lens and an imaging apparatus. In particular, the present invention relates to a zoom lens used in an electronic camera, such as a digital camera, a camera for broadcasting, a camera for surveillance and a camera for film making, and also to an imaging apparatus including the zoom lens.

Description of the Related Art

In zoom lenses used in imaging apparatuses, such as a video camera and an electronic still camera using imaging devices, such as a CCD (Charge Coupled Device) and a CMOS (Complementary Metal Oxide Semiconductor), as recording media, a request for higher variable magnification ratios is increasing. As a type of zoom lens achieving a high variable magnification ratio, a five-group-type zoom lens in which a positive group, a negative group, a positive group, a negative group and a positive group are arranged in this order from the object side is known (for example, Japanese Unexamined Patent Publication No. 2007-047538 (Patent Document 1), Japanese Unexamined Patent Publication No. 2008-304706 (Patent Document 2), Japanese Unexamined Patent Publication No. 2009-282429 (Patent Document 3), and Japanese Unexamined Patent Publication No. 2011-186417 (Patent Document 4)).

SUMMARY OF THE INVENTION

Patent Documents 1 through 3 disclose zoom lenses having variable magnification ratios of about 10 through 14.3. Patent Document 4 discloses a zoom lens having a variable magnification ratio of about 28.3.

However, when a zoom lens having an even higher variable magnification ratio is tried to be achieved, there are problems that the size of an optical system tends to become large, and that it becomes difficult to excellently correct various aberrations through an entire variable magnification range.

In view of the foregoing circumstances, it is an object of the present invention to provide a zoom lens small size in which various aberrations are excellently corrected through an entire variable magnification range while the zoom lens has a high variable magnification ratio, and also an imaging apparatus including the zoom lens.

A zoom lens of the present invention consists of a first lens group having positive refractive power, a second lens group having negative refractive power, a third lens group having positive refractive power, a fourth lens group having negative refractive power, and a fifth lens group having positive refractive power in this order from an object side. The third lens group includes a cemented lens closest to the object side and a cemented lens closest to an image side, and the fourth lens group consists of a negative lens and a positive lens in this order from the object side. Further, distances between the lens groups change, and the fifth lens group is fixed, and at least the first lens group and the fourth lens group move when magnification is changed from the wide angle end to the telephoto end.

In the zoom lens of the present invention, it is desirable that an aperture stop is arranged at a position next to the cemented lens closest to the object side in the third lens group.

Further, it is desirable that the first lens group and the fourth lens group are located closer to the object side at a telephoto end than their positions at a wide angle end, respectively, and that the following conditional expression is satisfied:

$$2.0 < |D1|/|D4| < 8.0 \quad (1),\text{ where}$$

D1: a difference between a position of the first lens group at the wide angle end and a position of the first lens group at the telephoto end on an optical axis, and D4: a difference between a position of the fourth lens group at the wide angle end and a position of the fourth lens group at the telephoto end on an optical axis.

Further, it is desirable that the following conditional expression is satisfied:

$$0.05 < |f5|/ft < 0.20 \quad (2),\text{ where}$$

f5: a focal length of the fifth lens group, and ft: a focal length of an entire system at the telephoto end.

Further, it is desirable that an image formation position is changed by moving, in a direction perpendicular to an optical axis, the whole third lens group or a part of lens groups included in the third lens group.

Further, it is desirable that an image formation position is changed by moving, in a direction perpendicular to an optical axis, the cemented lens closest to the image side in the third lens group.

Further, it is desirable that the following conditional expression is satisfied:

$$0.4 < f3o/f3i < 0.9 \quad (3),\text{ where}$$

f3o: a focal length of the cemented lens closest to the object side in the third lens group, and f3i: a focal length of the cemented lens closest to the image side in the third lens group.

Further, it is desirable that the third lens group consists of an aperture stop, the cemented lens of a positive lens and a negative lens, a cemented lens of a negative lens and a positive lens, a positive lens and the cemented lens of a negative lens and a positive lens in this order from the object side.

Further, it is desirable that the following conditional expression is satisfied:

$$0.30 < |D4|/|f4| < 1.00 \quad (4),\text{ where}$$

D4: a difference between a position of the fourth lens group at the wide angle end and a position of the fourth lens group at the telephoto end on an optical axis, and f4: a focal length of the fourth lens group.

Further, it is desirable that the following conditional expression is satisfied:

$$0.80 < |f4|/|f5| < 1.40 \quad (5),\text{ where}$$

f4: a focal length of the fourth lens group, and f5: a focal length of the fifth lens group.

Further, it is desirable that the following conditional expression is satisfied:

$$0.05 < |f4|/ft < 0.18 \quad (6),\text{ where}$$

f4: a focal length of the fourth lens group, and ft: a focal length of an entire system at the telephoto end.

Further, it is desirable that focusing is performed by moving the fourth lens group in an optical axis direction.

Further, it is desirable that the second lens group and the third lens group move when magnification is changed from the wide angle end to the telephoto end.

It is desirable that the fifth lens group consists of a positive lens with its convex surface facing the image side.

Further, it is desirable that the first lens group and the fourth lens group are located closer to the object side at a telephoto end than their positions at a wide angle end, respectively, and that the following conditional expression is satisfied:

$$4.0 < |D1|/|D4| < 7.5 \qquad (1\text{-}1).$$

Further, it is desirable that the first lens group and the fourth lens group are located closer to the object side at a telephoto end than their positions at a wide angle end, respectively, and that the following conditional expression is satisfied:

$$4.5 < |D1|/|D4| < 7.0 \qquad (1\text{-}2).$$

Further, it is desirable that the following conditional expression is satisfied:

$$0.07 < |f5|/ft < 0.11 \qquad (2\text{-}1).$$

Further, it is desirable that the following conditional expression is satisfied:

$$0.09 < |f5|/ft < 0.10 \qquad (2\text{-}2).$$

Further, it is desirable that the following conditional expression is satisfied:

$$0.5 < f3o/f3i < 0.8 \qquad (3\text{-}1).$$

Further, it is desirable that the following conditional expression is satisfied:

$$0.6 < f3o/f3i < 0.7 \qquad (3\text{-}2).$$

Further, it is desirable that the following conditional expression is satisfied:

$$0.50 < |D4|/|f4| < 0.80 \qquad (4\text{-}1).$$

Further, it is desirable that the following conditional expression is satisfied:

$$0.90 < |f4|/|f5| < 1.18 \qquad (5\text{-}1).$$

Further, it is desirable that the following conditional expression is satisfied:

$$0.07 < |f4|/ft < 0.12 \qquad (6\text{-}1).$$

An imaging apparatus of the present invention includes the zoom lens of the present invention, as described above.

A zoom lens of the present invention consists of a first lens group having positive refractive power, a second lens group having negative refractive power, a third lens group having positive refractive power, a fourth lens group having negative refractive power, and a fifth lens group having positive refractive power in this order from an object side. The third lens group includes a cemented lens closest to the object side and a cemented lens closest to an image side, and the fourth lens group consists of a negative lens and a positive lens in this order from the object side. Further, distances between the lens groups change, and the fifth lens group is fixed, and at least the first lens group and the fourth lens group move when magnification is changed from the wide angle end to the telephoto end. Therefore, it is possible to provide the zoom lens in small size in which various aberrations are excellently corrected through an entire variable magnification range while the zoom lens has a high variable magnification ratio.

Further, the imaging apparatus of the present invention includes the zoom lens of the present invention. Therefore, it is possible to obtain high-image-quality video images at high variable magnification ratios, and to reduce the size of the apparatus.

BRIEF DESCRIPTION OF THE DRAWINGS

FIG. 8 is aberration diagrams (Sections A through L) of the zoom lens in Example 1 of the present invention;

FIG. 9 is aberration diagrams (Sections A through L) of the zoom lens in Example 2 of the present invention;

FIG. 10 is aberration diagrams (Sections A through L) of the zoom lens in Example 3 of the present invention;

FIG. 11 is aberration diagrams (Sections A through L) of the zoom lens in Example 4 of the present invention;

FIG. 12 is aberration diagrams (Sections A through L) of the zoom lens in Example 5 of the present invention;

FIG. 13 is aberration diagrams (Sections A through L) of the zoom lens in Example 6 of the present invention.

DESCRIPTION OF THE PREFERRED EMBODIMENTS

Figure 1:
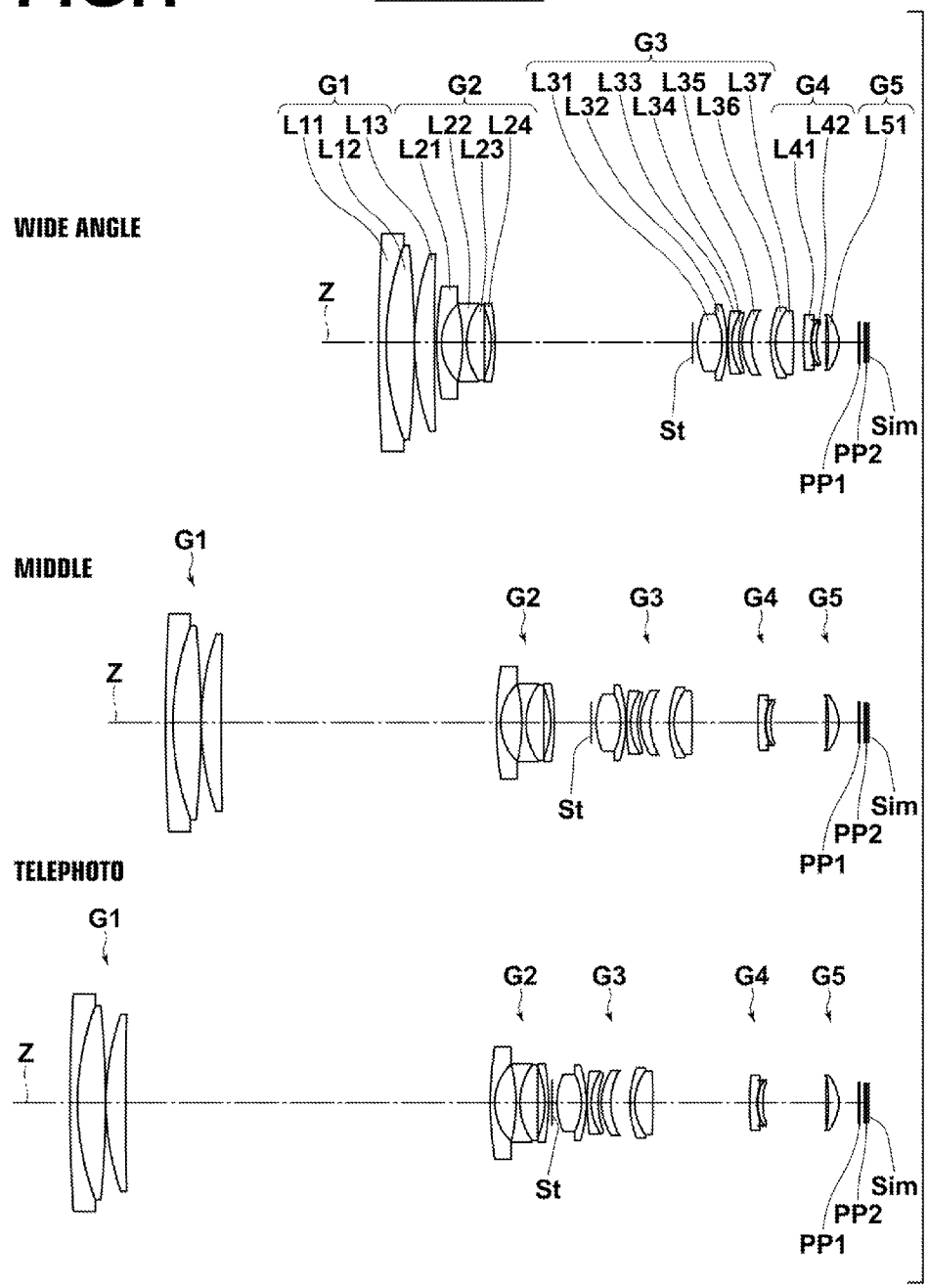
FIG. 1 is a cross section illustrating the lens configuration of a zoom lens according to an embodiment of the present invention (also Example 1)
Figure 2:
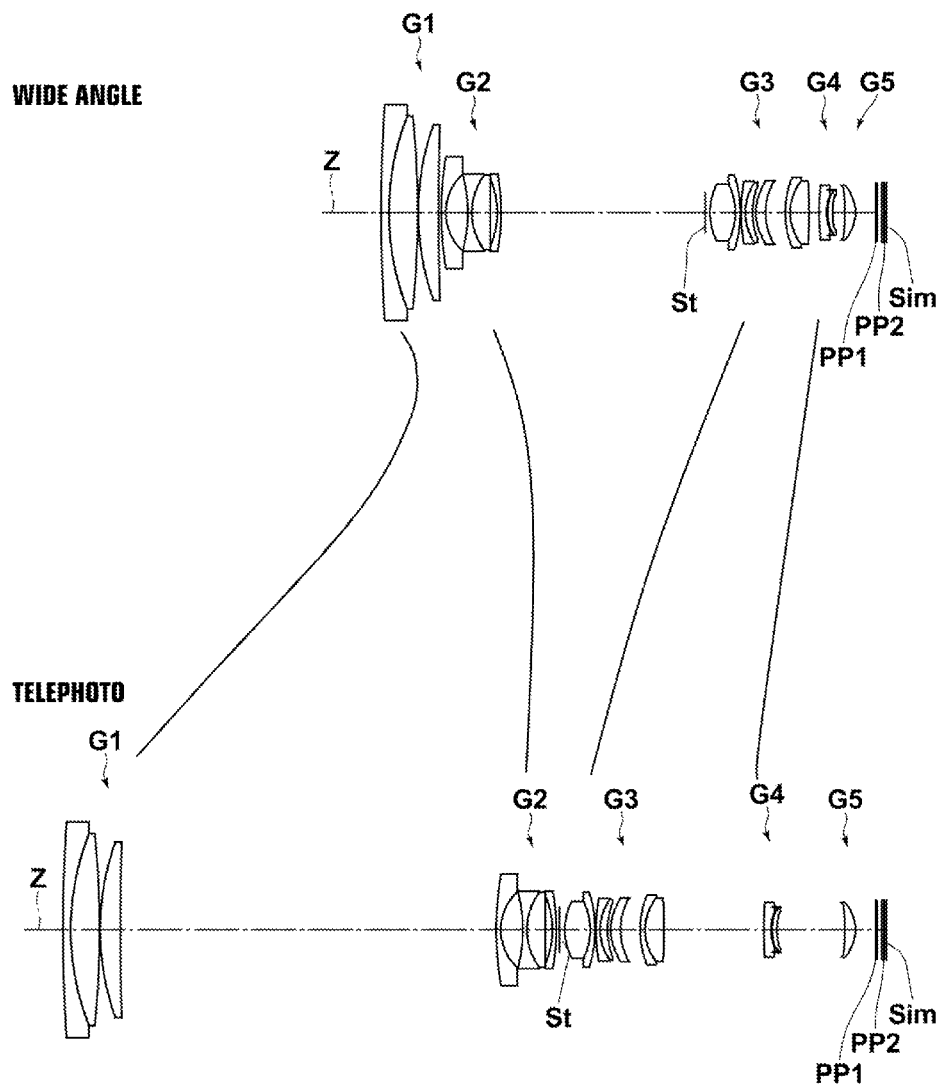
FIG. 2 is a cross section illustrating paths of movement of lens groups in the zoom lens.

Next, embodiments of the present invention will be described in detail with reference to drawings. FIG. 1 is a cross section illustrating the lens configuration of a zoom lens according to an embodiment of the present invention. FIG. 2 is a cross section illustrating paths of movement of lens groups in the zoom lens. The example of configuration illustrated in FIGS. 1 and 2 is also the configuration of a zoom lens in Example 1, which will be described later. In FIGS. 1 and 2, a left side is an object side, and a right side is an image side.

This zoom lens consists of first lens group G1 having positive refractive power, second lens group G2 having negative refractive power, aperture stop St, third lens group G3 having positive refractive power, fourth lens group G4 having negative refractive power, and fifth lens group G5 having positive refractive power along optical axis Z in this order from an object side. Further, distances between the lens groups change, and fifth lens group G5 is fixed, and at least first lens group G1 and fourth lens group G4 move when magnification is changed from the wide angle end to the telephoto end. Here, aperture stop St illustrated in FIGS.

1 and 2 does not necessarily represent the size nor the shape of the aperture stop, but the position of the aperture stop on optical axis Z.

When this zoom lens is applied to an imaging apparatus, it is desirable to arrange a cover glass, a prism, and various filters, such as an infrared-ray-cut filter and a low-pass filter, between an optical system and image plane Sim based on the configuration of a camera on which the lens is mounted. Therefore. FIGS. 1 and 2 illustrate an example in which parallel-flat-plate-shaped optical members PP1, PP2, which are assumed to be these elements, are arranged between fifth lens group G5 and image plane Sim.

Third lens group G3 includes a cemented lens consisting of positive lens L31 and negative lens L32 at a position closest to the object side and a cemented lens consisting of negative lens L36 and positive lens L37 at a position closest to the image side.

Fourth lens group G4 consists of negative lens L41 and positive lens L42 in this order from the object side.

In third lens group G3, the cemented lenses are arranged at a position closest to the object side and at a position closest to the image side so that they are away from each other with a distance therebetween. Therefore, it is possible to separate the effect of correcting a lateral chromatic aberration and the effect of correcting a longitudinal chromatic aberration by the respective cemented lenses from each other. Hence, it is possible to excellently control the balance between the longitudinal chromatic aberration and the lateral chromatic aberration.

Further, since fourth lens group G4 is configured as described above, excellent correction of curvature of field is achievable.

In the zoom lens according to an embodiment of the present invention, it is desirable that aperture stop St is arranged at a position next to the cemented lens closest to the object side in third lens group G3. Accordingly, the cemented lens closest to the object side has an effect of correcting a longitudinal chromatic aberration, and the cemented lens closest to the image side has an effect of correcting a lateral chromatic aberration, and it is possible to easily control the balance between the longitudinal chromatic aberration and the lateral chromatic aberration through the entire variable magnification range.

Further, it is desirable that first lens group G1 and fourth lens group G4 are located closer to the object side at a telephoto end than their positions at a wide angle end, respectively, and that the following conditional expression (1) is satisfied. This conditional expression (1) defines a ratio of a movement amount of first lens group G1 to a movement amount of fourth lens group G4. If the value is lower than the lower limit of conditional expression (1), the effect of variable magnification by first lens group G1 and fourth lens group G4 becomes weak. Therefore, it becomes difficult to secure a sufficient variable magnification ratio while achieving reduction in the size of the zoom lens. In contrast, if the value exceeds the upper limit of conditional expression (1), the effect of correcting curvature of field by fourth lens group G4 becomes weak. Therefore, it becomes difficult to suppress curvature of field caused by variable magnification. When the following conditional expression (1-1), and more desirably the following conditional expression (1-2) are satisfied, more excellent characteristics are achievable.

$$2.0 < |D1|/|D4| < 8.0 \tag{1};$$

$$4.0 < |D1|/|D4| < 7.5 \tag{1-1); and}$$

$$4.5 < |D1|/|D4| < 7.0 \tag{1-2), where}$$

D1: a difference between a position of the first lens group at the wide angle end and a position of the first lens group at the telephoto end on an optical axis, and D4: a difference between a position of the fourth lens group at the wide angle end and a position of the fourth lens group at the telephoto end on an optical axis.

Further, it is desirable that the following conditional expression (2) is satisfied. This conditional expression (2) defines a ratio of the focal length of fifth lens group G5 to the focal length of the entire system at the telephoto end. If the value is lower than the lower limit of conditional expression (2), the refractive power of fifth lens group G5 becomes too strong, and correction of a coma aberration becomes difficult. In contrast, if the value exceeds the upper limit of conditional expression (2), the refractive power of fifth lens group G5 becomes insufficient, and correction of various aberrations at the telephoto end becomes difficult. When the following conditional expression (2-1), and more desirably the following conditional expression (2-2) are satisfied, more excellent characteristics are achievable.

$$0.05 < |f5|/ft < 0.20 \tag{2};$$

$$0.07 < |f5|/ft < 0.11 \tag{2-1); and}$$

$$0.09 < |f5|/ft < 0.10 \tag{2-2), where}$$

f5: a focal length of the fifth lens group, and ft: a focal length of the entire system at the telephoto end.

Further, it is desirable that an image formation position is changed by moving, in a direction perpendicular to an optical axis, the whole third lens group G3 or a part of lens groups included, in third lens group G3. Accordingly, a hand shake blur correction mechanism in which deterioration of performance is small through the entire variable magnification range is achievable.

Further, is desirable that an image formation position is changed by moving, in a direction perpendicular to an optical axis, the cemented lens closest to the image side in third lens group G3. Accordingly, a hand shake blur correction mechanism in which deterioration of performance is small through the entire variable magnification range is achievable while the weight of the lens to be moved is suppressed.

Further, it is desirable that the following conditional expression (3) is satisfied. This conditional expression (3) defines a ratio of the focal length of the cemented lens closest to the object side in third lens group G3 to the focal length of the cemented lens closest to the image side in third lens group G3. If the value is lower than the lower limit of conditional expression (3), the sensitivity of the cemented lens closest to the object side in third lens group G3 becomes high, and it becomes difficult to suppress deterioration in performance caused by an error in production. In contrast, if the value exceeds the upper limit of conditional expression (3), the balance between the refractive power of the cemented lens closest to the object side in third lens group G3 and the refractive power of the cemented lens closest to the image side in third lens group G3 is lost, and it becomes difficult to correct a spherical aberration. When the following conditional expression (3-1), and more desirably the following conditional expression (3-2) are satisfied, more excellent characteristics are achievable.

$$0.4 < f3o/f3i < 0.9 \tag{3};$$

$$0.5 < f3o/f3i < 0.8 \tag{3-1); and}$$

$$0.6 < f3o/f3i < 0.7 \tag{3-2), where}$$

f3o: a focal length the cemented lens closest to the object side in the third lens group, and f3i: a focal length of the cemented lens closest to the image side in the third lens group.

Further, it is desirable that third lens group G3 consists of aperture stop St, a cemented lens of positive lens L31 and negative lens L32, a cemented lens of negative lens L33 and positive lens L34, positive lens L35 and a cemented lens of negative lens L36 and positive lens L37 in this order from the object side. Accordingly, the cemented lens consisting of positive lens L31 and negative lens L32 can excellently correct a spherical aberration and a longitudinal chromatic aberration through the entire variable magnification range. Further, the cemented lens consisting of negative lens L33 and positive lens L34 can control the balance of a longitudinal chromatic aberration and a lateral chromatic aberration through the entire variable magnification range. Further, positive lens L35 can excellently correct a spherical aberration, and the cemented lens consisting of negative lens L36 and positive lens L37 can excellently correct a lateral chromatic aberration through the entire variable magnification range.

Further, it is desirable that the following conditional expression (4) is satisfied. This conditional expression (4) defines a ratio of the movement amount of fourth lens group G4 to the focal length of fourth lens group G4. If the value is lower than the lower limit of conditional expression (4), the effect of correcting curvature of field by fourth lens group G4 becomes insufficient, and it becomes difficult to obtain an excellent image at each variable magnification range. In contrast, if the value exceeds the upper limit of conditional expression (4), the effect of correcting curvature of field by fourth lens group G4 becomes too strong, and it becomes difficult to balance aberrations. When the following conditional expression (4-1) is satisfied, more excellent characteristics are achievable.

$$0.30 < |D4|/|f4| < 1.00 \quad (4); \text{ and}$$

$$0.50 < |D4|/|f4| < 0.80 \quad (4\text{-}1), \text{ where}$$

D4: a difference between a position of the fourth lens group at the wide angle end and a position of the fourth lens group at the telephoto end on an optical axis, and f4: a focal length of the fourth lens group.

Further, it is desirable that the following conditional expression (5) is satisfied. This conditional expression (5) defines a ratio of a focal length of fourth lens group G4 to a focal length of fifth lens group G5. If the value is lower than the lower limit of conditional expression (5), the refractive power of fourth lens group G4 becomes too strong, and correction of a spherical aberration becomes difficult. In contrast, if the value exceeds the upper limit of conditional expression (5), the refractive power of fifth lens group G5 becomes too strong, and correction of various aberrations becomes difficult. When the following conditional expression (5-1) is satisfied, more excellent characteristics are achievable.

$$0.80 < |f4|/|f5| < 1.40 \quad (5); \text{ and}$$

$$0.90 < |f4|/|f5| < 1.18 \quad (5\text{-}1), \text{ where}$$

f4: a focal length of the fourth lens group, and f5: a focal length of the fifth lens group.

Further, it is desirable that the following conditional expression (6) is satisfied. This conditional expression (6) defines a ratio of focal length of fourth lens group G4 to a focal length of the entire system at a telephoto end. If the value is lower than the lower limit of conditional expression (6), the refractive power of fourth lens group G4 becomes too strong, and correction of a spherical aberration becomes difficult. In contrast, if the value exceeds the upper limit of conditional expression (6), the refractive power of fourth lens group G4 becomes insufficient, and correction of aberrations in an off-axial area becomes difficult. When the following conditional expression (6-1) is satisfied, more excellent characteristics are achievable.

$$0.05 < |f4|/ft < 0.18 \quad (6); \text{ and}$$

$$0.07 < |f4|/ft < 0.12 \quad (6\text{-}1), \text{ where}$$

f4: a focal length of the fourth lens group, and ft: a focal length of the entire system at the telephoto end.

Further, it is desirable that focusing is performed by moving fourth lens group G4 in an optical axis direction. The diameter of rays becomes small in the vicinity of fourth lens group G4. Therefore, when focusing is performed by moving fourth lens group G4 in the optical axis direction as described above, a focusing group in small size and with light weight is achievable.

Further, it is desirable that second lens group G2 and third lens group G3 move when magnification is changed from the wide angle end to the telephoto end. Accordingly, it is possible to achieve a high variable magnification ratio while reducing the size of an optical system.

It is desirable that fifth lens group G5 consists of one lens of positive lens L51 with its convex surface facing the image side. Accordingly, it is possible to suppress the cost, and to reduce ghost caused by reflection from an image formation surface.

Specifically, in the zoom lens of the present invention, it is desirable to use glass, as a material arranged closest to the object side. Alternatively, transparent ceramic may be used.

When the zoom lens of the present invention is used in tough conditions, it is desirable that a multi-layer coating for protection is applied to the zoom lens. Further, an anti-reflection coating for reducing ghost light during use or the like may be applied to the zoom lens in addition to the coating for protection.

FIG. 1 illustrates an example in which optical members PP1, PP2 are arranged between the lens system and image plane Sim. Instead of arranging various filters, such as a low-pass filter and a filter that cuts a specific wavelength band, and the like between the lens system and image plane Sim, the various filters may be arranged between lenses. Alternatively, a coating having a similar action to the various filters may be applied to a lens surface of one of the lenses.

Next, numerical value examples of the zoom lens of the present invention will be described.

First, the zoom lens in Example 1 will be described. FIG. 1 is a cross section illustrating the lens configuration of the zoom lens in Example 1. In FIG. 1 and FIGS. 3 through 7 corresponding to Examples 2 through 6, which will be described later, optical members PP1, PP2 are also illustrated, and the left side is an object side, and the right side is an image side. Illustrated aperture stop St does not necessarily represent the size nor the shape of the aperture stop, but the position of the aperture stop an optical axis Z.

The zoom lens in Example 1 consists of first lens group G1 having positive refractive power, second lens group G2 having negative refractive power, aperture stop St, third lens group G3 having positive refractive power, fourth lens group G4 having negative refractive power and fifth lens group G5 having positive refractive power along optical axis Z in this order from an object side.

First lens group G1 consists of a cemented lens consisting of negative lens L11 and positive lens L12, and a cemented surface of which is convex toward the object side and positive lens L13 in this order from the object side. The cemented lens consisting of negative lens L11 and positive lens L12 has an effect of correcting a longitudinal chromatic aberration at a telephoto side. Positive lens L13 has an effect of correcting curvature of field at a telephoto end.

Second lens group G2 consists of negative lens L21, a cemented lens consisting of negative lens L22 and positive lens L23, and a cemented surface of which is convex toward the object side and negative lens L24 in this order from the object side. The cemented lens consisting of negative lens L22 and positive lens L23 has an effect of correcting a lateral chromatic aberration at a wide angle end.

Third lens group G3 consists of a cemented lens consisting of positive lens L31 and negative lens L32, and a cemented surface of which is convex toward the image side, a cemented lens consisting of negative lens L33 and positive lens L34, and a cemented surface of which is convex toward the object side, aspheric lens L35 having positive refractive power, and a cemented lens consisting of negative lens L36 and positive lens L37, and a cemented surface of which is convex toward the object side in this order from the object side. The cemented lens consisting of positive lens L31 and negative lens L32 has an effect of correcting a spherical aberration and a longitudinal chromatic aberration through the entire variable magnification range. The cemented lens consisting of negative lens L33 and positive lens L34 has an effect of controlling the balance between a longitudinal chromatic aberration and a lateral chromatic aberration through the entire variable magnification range. Aspheric lens L35 has an effect of correcting a spherical aberration. The cemented lens consisting of negative lens L36 and positive lens L37 has an effect of correcting a lateral chromatic aberration through the entire variable magnification range.

Fourth lens group G4 consists of negative lens L41 and aspheric lens L42 having positive refractive power in this order from the object side. Negative lens L41 and aspheric lens L42 have an effect of correcting curvature of field through the entire variable magnification range.

Fifth lens group G5 consists of one lens of aspheric lens L51 having positive refractive power. This aspheric lens L51 has an effect of correcting distortion and curvature of field through the entire variable magnification range.

When magnification is changed from a wide angle end to a telephoto end, first lens group G1 moves toward the object side, and second lens group G2 moves toward the image side, and aperture stop St and third lens group G3 move in an integrated manner toward the object side, and fourth lens group G4 moves toward the object side, and fifth lens group G5 is fixed on an optical axis.

Further, focusing is performed by moving fourth lens group G4 on an optical axis.

Further, the zoom lens is configured in such a manner that the cemented lens consisting of negative lens L36 and positive lens L37 in third lens group G3 is movable in a direction perpendicular to the optical axis to prevent image shaking.

Table 1 shows basic lens data of the zoom lens in Example 1. Table 2 shows data about the specification of the zoom lens in Example 1. Table 3 shows data about moving surface distances. Table 4 shows data about aspheric surface coefficients. In the following descriptions, the meanings of signs in the tables will be described by using the tables of Example 1, as an example. The meanings of signs in the tables of Examples 2 through 6 are basically similar to those of Example 1.

In the lens data of Table 1, a column of Si shows the surface number of an i-th surface (i=1, 2, 3 . . . ) when a surface of composition elements closest to the object side is the first surface and the surface numbers sequentially increase toward the image side. A column of Ri shows the curvature radius of the i-th surface. A column of Di shows a distance, on optical axis Z, between the i-th surface and (i+1)th surface. Further, a column of Ndj shows the refractive index of a j-th optical element (j=1, 2, 3 . . . ) for d-line (wavelength is 587.6 nm) when an optical element closest to the object side is the first optical element and j sequentially increases toward the image side. A column of vdj similarly shows the Abbe number of the j-th optical element for d-line (wavelength is 587.6 nm).

Here, the sign of a curvature radius is positive when a surface shape is convex toward the object side, and negative when a surface shape is convex toward the image side. The basic lens data show data including aperture stop St and optical members PP1, PP2. In the column of surface numbers, the term "(STOP)" is written together with the surface number of a surface corresponding to aperture stop St. Further, in the lens data of Table 1, "DD[i]" is written in a row of a surface distance that changes during magnification change. Further, a value at the bottom of the column of Di is a distance between an image-side surface of optical member PP and image plane Sim.

Data about specification in Table 2 show values of a zoom ratio, focal length f', F-number FNo, and full angle of view 2ω for each of wide angle, middle and telephoto.

In the basic lens data, data about specification and data about moving surface distances, degree is used as the unit of an angle, and mm is used as the unit of a length. However, since an optical system is usable by proportionally enlarging the optical system or by proportionally reducing the optical system, other appropriate units may be used.

In the lens data of Table 1, mark "*" is attached to the surface numbers of aspheric surfaces. Further, a numerical value of a paraxial curvature radius is used as the curvature radius of an aspheric surface. The data about aspheric surface coefficients in Table 4 show surface numbers Si of aspheric surfaces and aspheric surface coefficients about the aspheric surfaces. The aspheric surface coefficients are values of coefficients KA, Am (m=3, 4, 5, . . . 20) in an aspheric surface equation represented by the following equation (A):

$$Zd = C \cdot h^2 / \{1 + (1 - KA \cdot C^2 \cdot h^2)^{1/2}\} + \Sigma Am \cdot h^m \quad (A),$$ where Zd: the depth of an aspheric surface (the length of a perpendicular from a point on the aspheric surface at height h to a flat plane that contacts with the vertex of the aspheric surface and is perpendicular to the optical axis), h: height (a length from the optical axis), C: a reciprocal of a paraxial curvature radius, and KA, Am: aspheric surface coefficients (m=3, 4, 5, . . . 20).

TABLE 1

EXAMPLE 1·LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 362.4842 | 1.72 | 1.83400 | 37.16 |
| 2 | 57.4780 | 6.31 | 1.48749 | 70.45 |

TABLE 1-continued

EXAMPLE 1·LENS DATA

| Si (SURFACE NUMBER) | Ri (CURVA- TURE RADIUS) | Di (SURFACE DISTANCE) | Ndj (REFRAC- TIVE INDEX) | vdj (ABBE NUMBER) |
|---|---|---|---|---|
| 3 | −206.7739 | 0.10 | | |
| 4 | 56.5443 | 4.46 | 1.62299 | 58.16 |
| 5 | 717.8887 | DD[5] | | |
| 6 | 72.6395 | 1.00 | 1.80610 | 40.92 |
| 7 | 11.4838 | 4.81 | | |
| 8 | −32.6696 | 0.91 | 1.70000 | 48.08 |
| 9 | 13.7040 | 4.01 | 1.92286 | 20.88 |
| 10 | ∞ | 1.57 | | |
| 11 | −18.7969 | 0.85 | 1.80610 | 40.92 |
| 12 | −47.2729 | DD[12] | | |
| 13(STOP) | ∞ | 1.10 | | |
| 14 | 13.8650 | 5.56 | 1.49700 | 81.54 |
| 15 | −13.8650 | 1.09 | 1.72342 | 37.95 |
| 16 | −26.1923 | 0.20 | | |
| 17 | 43.5383 | 0.91 | 1.62299 | 58.16 |
| 18 | 11.6360 | 1.58 | 1.61772 | 49.81 |
| 19 | 16.2256 | 0.70 | | |
| *20 | 10.5989 | 2.15 | 1.56867 | 58.50 |
| *21 | 14.1490 | 4.32 | | |
| 22 | 20.3529 | 1.09 | 1.80000 | 29.84 |
| 23 | 11.1740 | 4.12 | 1.62299 | 58.16 |
| 24 | −102.8214 | DD[24] | | |
| 25 | 73.2882 | 1.60 | 1.83481 | 42.73 |
| 26 | 10.7587 | 0.24 | | |
| *27 | 11.3593 | 1.08 | 1.53388 | 55.37 |
| *28 | 14.8140 | DD[28] | | |
| *29 | −81.1234 | 2.32 | 1.53388 | 55.37 |
| *30 | −8.1611 | 4.47 | | |
| 31 | ∞ | 0.30 | 1.51680 | 64.20 |
| 32 | ∞ | 1.00 | | |
| 33 | ∞ | 0.50 | 1.51680 | 64.20 |
| 34 | ∞ | 0.50 | | |

TABLE 2

EXAMPLE 1·SPECIFICATION (d-LINE)

| | WIDE ANGLE | MIDDLE | TELEPHOTO |
|---|---|---|---|
| ZOOM RATIO | 1.0 | 11.9 | 39.3 |
| f' | 4.57 | 54.12 | 179.16 |
| FNo. | 2.88 | 5.38 | 5.76 |
| 2ω[°] | 93.4 | 8.2 | 2.6 |

TABLE 3

EXAMPLE 1·ZOOM DISTANCE

| | WIDE ANGLE | MIDDLE | TELEPHOTO |
|---|---|---|---|
| DD[5] | 0.59 | 62.23 | 82.43 |
| DD[12] | 44.69 | 8.32 | 0.79 |
| DD[24] | 2.25 | 14.84 | 21.89 |
| DD[28] | 2.70 | 13.03 | 14.88 |

TABLE 4

EXAMPLE 1·ASPHERIC SURFACE COEFFICIENT

| | SURFACE NUMBER | | |
|---|---|---|---|
| | 20 | 21 | 27 |
| KA | 1.0000000E+00 | 1.0000000E+00 | 1.0000000E+00 |
| A3 | −1.0516159E−04 | −9.1747554E−05 | −1.5314378E−03 |
| A4 | −3.8789271E−05 | 8.7097564E−05 | 1.6749654E−05 |

TABLE 4-continued

EXAMPLE 1·ASPHERIC SURFACE COEFFICIENT

| A5 | −4.8762087E−06 | 1.8833381E−06 | 3.2253906E−05 |
|---|---|---|---|
| A6 | −4.6050846E−07 | −4.7316497E−07 | 7.2886716E−06 |
| A7 | −5.2632173E−08 | −9.0891648E−08 | 1.3455226E−06 |
| A8 | −7.8958666E−09 | −1.1374683E−08 | 1.4063988E−07 |
| A9 | −1.2974593E−09 | −1.3549817E−09 | −5.2297854E−08 |
| A10 | −2.1144519E−10 | −1.7940316E−10 | −2.0863806E−08 |
| A11 | −3.4168788E−11 | −2.6336269E−11 | −5.7516651E−10 |
| A12 | −5.1431845E−12 | −4.4220306E−12 | 2.7376679E−09 |
| A13 | −6.8161691E−13 | −7.8045858E−13 | −6.3485802E−10 |
| A14 | −7.9516787E−14 | −1.3479075E−13 | −9.0443735E−11 |
| A15 | −6.6311210E−15 | −2.1537879E−14 | −7.1780632E−11 |
| A16 | 4.8207430E−17 | −3.3839111E−15 | 2.9050733E−11 |
| A17 | 1.5517635E−16 | −3.3375756E−16 | −1.5269386E−12 |
| A18 | 4.3332536E−17 | 3.8805055E−18 | 4.1184629E−12 |
| A19 | 8.5513130E−18 | 2.1304547E−17 | 4.7879698E−13 |
| A20 | 1.2405948E−18 | 8.4338611E−18 | −2.7619465E−13 |

| | SURFACE NUMBER | | |
|---|---|---|---|
| | 28 | 29 | 30 |
| KA | 1.0000000E+00 | 1.0000000E+00 | 1.0000000E+00 |
| A3 | −2.1295869E−03 | −7.6967899E−04 | −4.5320786E−04 |
| A4 | 3.3383939E−04 | −2.5875100E−04 | 2.0860820E−04 |
| A5 | 1.2841420E−05 | −2.8087332E−06 | 1.3740131E−05 |
| A6 | −7.3897407E−07 | 3.2997117E−06 | 2.5386565E−07 |
| A7 | 5.5167990E−07 | 5.6427843E−07 | 6.2404777E−08 |
| A8 | 4.4964683E−07 | 5.5290383E−08 | 2.2584953E−08 |
| A9 | 1.6191746E−07 | 3.2339133E−09 | 6.2958355E−09 |
| A10 | 3.0484697E−08 | −4.9219540E−10 | 1.0834809E−09 |
| A11 | 1.1983640E−08 | −1.5232367E−10 | 2.0025667E−10 |
| A12 | −5.0730454E−11 | −3.3959307E−11 | 3.2310516E−11 |
| A13 | −1.2620382E−09 | 1.1647490E−12 | 3.7959960E−12 |
| A14 | −5.0880133E−10 | 1.1691819E−12 | 5.7482478E−13 |
| A15 | −7.9496878E−11 | 3.3840069E−13 | −3.3468075E−14 |
| A16 | 5.1096798E−11 | 7.5625817E−14 | −2.3698080E−14 |
| A17 | −1.0256523E−11 | 1.4472349E−14 | −5.2974199E−15 |
| A18 | 3.8120527E−13 | −3.4813157E−16 | −9.2811009E−16 |
| A19 | −4.0580402E−13 | −1.0093332E−15 | −2.3449931E−16 |
| A20 | 4.3265842E−13 | −1.3016265E−16 | 5.8142812E−18 |

FIG. 8, Sections A through L are aberration diagrams of the zoom lens in Example 1. FIG. 8, Sections A through D illustrate a spherical aberration, astigmatism, distortion and a lateral chromatic aberration at wide angle, respectively. FIG. 8, Sections E through H illustrate a spherical aberration astigmatism, distortion and a lateral chromatic aberration at middle, respectively. FIG. 8, Sections I through L illustrate a spherical aberration, astigmatism, distortion and a lateral chromatic aberration at telephoto, respectively.

Aberration diagrams of a spherical aberration, astigmatism and distortion show aberrations when d-line (wavelength is 587.6 nm) is a reference wavelength. In the aberration diagram of the spherical aberration, aberrations for d-line (wavelength is 587.6 nm), C-line (wavelength is 656.3 nm) and F-line (wavelength is 486.1 nm) are indicated by a solid line, a long broken line and a short broken line, respectively. In the aberration diagram of the astigmatism, an aberration in a sagittal direction and an aberration in a tangential direction are indicated by a solid line and a broken line, respectively. In the aberration diagram of the lateral chromatic aberration, an aberration for C-line (wavelength is 656.3 nm) and an aberration for F-line (wavelength is 486.1 nm) are indicated by a long broken line and a short broken line, respectively. In the aberration diagram of the spherical aberration, FNo represents an F-number. In the other aberration diagrams, ω means a half angle of view.

Figure 3:
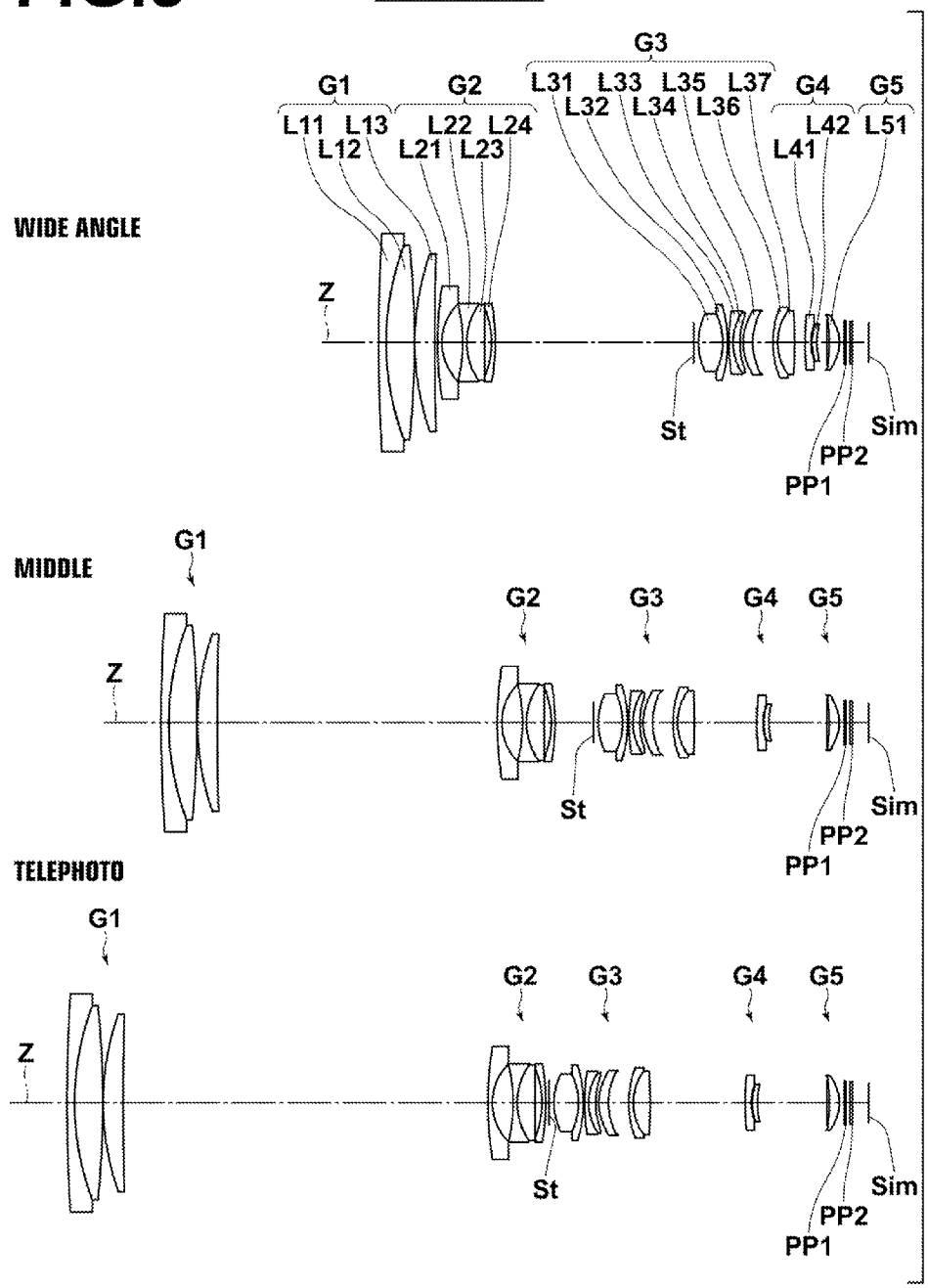
FIG. 3 is a cross section illustrating the lens configuration of a zoom lens in Example 2 of the present invention.

Next, a zoom lens in Example 2 will be described. FIG. 3 is a cross section illustrating the lens configuration of the zoom lens in Example 2.

The shape of the zoom lens in Example 2 is similar to that of the zoom lens in Example 1.

Table 5 shows basic lens data of the zoom lens in Example 2. Table 6 shows data about the specification of the zoom lens in Example 2. Table 7 shows data about moving surface distances. Table 8 shows data about aspheric surface coefficients. FIG. 9, Sections A through L illustrate aberration diagrams.

TABLE 5

EXAMPLE 2·LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 361.9848 | 1.72 | 1.83400 | 37.16 |
| 2 | 57.4275 | 6.35 | 1.48749 | 70.45 |
| 3 | −206.5157 | 0.10 | | |
| 4 | 56.5953 | 4.52 | 1.62299 | 58.16 |
| 5 | 714.0123 | DD[5] | | |
| 6 | 73.1568 | 1.00 | 1.80610 | 40.92 |
| 7 | 11.5503 | 4.70 | | |
| 8 | −33.0686 | 0.91 | 1.70000 | 48.08 |
| 9 | 13.8321 | 4.01 | 1.92286 | 20.88 |
| 10 | −214748.3648 | 1.58 | | |
| 11 | −18.8727 | 0.85 | 1.80610 | 40.92 |
| 12 | −46.7974 | DD[12] | | |
| 13(STOP) | ∞ | 1.10 | | |
| 14 | 13.8782 | 5.50 | 1.49700 | 81.54 |
| 15 | −13.9454 | 1.11 | 1.72342 | 37.95 |
| 16 | −26.1834 | 0.28 | | |
| 17 | 43.7251 | 0.92 | 1.62299 | 58.16 |
| 18 | 11.5029 | 1.57 | 1.61772 | 49.81 |
| 19 | 16.2031 | 0.70 | | |
| *20 | 10.6048 | 2.19 | 1.56867 | 58.50 |
| *21 | 14.1140 | 4.57 | | |
| 22 | 20.4066 | 1.04 | 1.80000 | 29.84 |
| 23 | 11.3163 | 3.81 | 1.62299 | 58.16 |
| 24 | −107.9573 | DD[24] | | |
| 25 | 69.3959 | 1.35 | 1.83481 | 42.73 |
| 26 | 11.0130 | 0.22 | | |
| *27 | 11.1392 | 1.13 | 1.53388 | 55.37 |
| *28 | 15.1443 | DD[28] | | |
| *29 | −64.4136 | 2.30 | 1.53388 | 55.37 |
| *30 | −8.1494 | 1.10 | | |
| 31 | ∞ | 0.30 | 1.51680 | 64.20 |
| 32 | ∞ | 1.00 | | |
| 33 | ∞ | 0.50 | 1.51680 | 64.20 |
| 34 | ∞ | 3.72 | | |

TABLE 6

EXAMPLE 2·SPECIFICATION (d-LINE)

| | WIDE ANGLE | MIDDLE | TELEPHOTO |
|---|---|---|---|
| ZOOM RATIO | 1.0 | 11.9 | 39.3 |
| f | 4.57 | 54.13 | 179.36 |
| FNo. | 2.85 | 5.29 | 5.88 |
| 2ω[°] | 93.4 | 8.2 | 2.4 |

TABLE 7

EXAMPLE 2·ZOOM DISTANCE

| | WIDE ANGLE | MIDDLE | TELEPHOTO |
|---|---|---|---|
| DD[5] | 0.61 | 63.16 | 82.31 |
| DD[12] | 44.75 | 8.65 | 0.79 |
| DD[24] | 2.37 | 14.11 | 21.48 |
| DD[28] | 2.76 | 13.61 | 16.24 |

TABLE 8

EXAMPLE 2·ASPHERIC SURFACE COEFFICIENT

| | SURFACE NUMBER | | |
|---|---|---|---|
| | 20 | 21 | 27 |
| KA | 1.0000000E+00 | 1.0000000E+00 | 1.0000000E+00 |
| A3 | −1.0286581E−04 | −8.9892688E−05 | −1.5244858E−03 |
| A4 | −3.8820272E−05 | 8.6870934E−05 | 2.4599060E−05 |
| A5 | −4.8949965E−06 | 1.8484031E−06 | 2.3257118E−05 |
| A6 | −4.7032133E−07 | −4.8775321E−07 | 3.5764318E−06 |
| A7 | −5.5180327E−08 | −9.3591642E−08 | 3.9735908E−07 |
| A8 | −8.2567078E−09 | −1.1827353E−08 | −3.0976949E−08 |
| A9 | −1.3435603E−09 | −1.4177677E−09 | −8.7127318E−08 |
| A10 | −2.1701831E−10 | −1.8618591E−10 | −6.9660293E−09 |
| A11 | −3.4749203E−11 | −2.6779485E−11 | 1.5310075E−08 |
| A12 | −5.1755651E−12 | −4.3891404E−12 | −5.1445794E−10 |
| A13 | −6.7518148E−13 | −7.6094855E−13 | 1.7131097E−09 |
| A14 | −7.6392542E−14 | −1.2976511E−13 | −2.6491948E−10 |
| A15 | −5.7720643E−15 | −2.0469631E−14 | 1.8056123E−10 |
| A16 | 2.4102552E−16 | −3.1739399E−15 | −3.5122342E−11 |
| A17 | 1.9354475E−16 | −2.9206766E−16 | −7.6833914E−12 |
| A18 | 5.0341226E−17 | 1.2479765E−17 | 3.9513748E−12 |
| A19 | 9.6985686E−18 | 2.3209475E−17 | −4.2472694E−13 |
| A20 | 1.4028586E−18 | 8.8616607E−18 | −1.5134581E−13 |

| | SURFACE NUMBER | | |
|---|---|---|---|
| | 28 | 29 | 30 |
| KA | 1.0000000E+00 | 1.0000000E+00 | 1.0000000E+00 |
| A3 | −2.1387632E−03 | −8.8493280E−04 | −4.8354881E−04 |
| A4 | 3.0250870E−04 | −2.5344251E−04 | 2.1824118E−04 |
| A5 | 5.3767693E−06 | −2.4225659E−06 | 1.7543566E−05 |
| A6 | −1.9934096E−06 | 3.5824878E−06 | 9.5470038E−07 |
| A7 | 3.9779558E−08 | 6.6766533E−07 | 1.7352661E−07 |
| A8 | 3.6430425E−07 | 8.3006268E−08 | 4.0003984E−08 |
| A9 | 1.4111141E−07 | 9.0184053E−09 | 9.0696528E−09 |
| A10 | 2.8516487E−08 | 5.8271792E−10 | 1.4895987E−09 |
| A11 | 5.8561476E−09 | 4.3159505E−11 | 2.4568728E−10 |
| A12 | 9.4164442E−10 | 7.5842616E−12 | 3.8599042E−11 |
| A13 | −2.0715254E−09 | 4.2068396E−12 | 6.5694808E−12 |
| A14 | −7.5930475E−10 | 1.7847687E−12 | 9.7281781E−13 |
| A15 | 1.8415257E−10 | 1.3782047E−13 | 8.3691310E−14 |
| A16 | 1.7963568E−10 | 2.8217243E−14 | −1.0132554E−14 |
| A17 | −1.5774615E−11 | 1.0945129E−15 | −1.7443908E−15 |
| A18 | −1.4288723E−12 | −8.6546515E−16 | 1.3880904E−16 |
| A19 | −3.7349390E−12 | −1.7856760E−15 | −6.8559823E−16 |
| A20 | 6.2642339E−13 | 7.2309798E−17 | −4.1543851E−17 |

Figure 4:
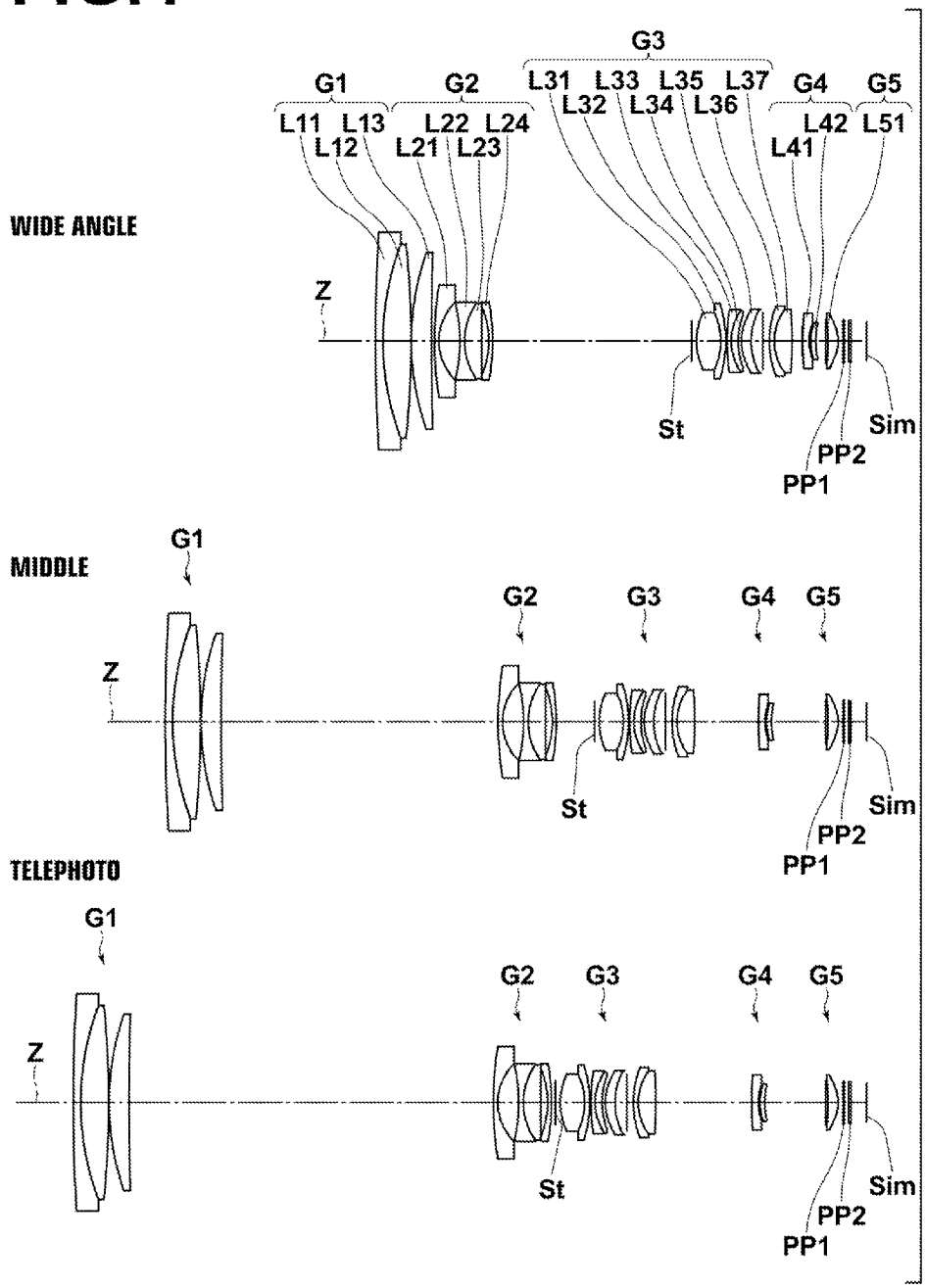
FIG. 4 is a cross section illustrating the lens configuration of a zoom lens in Example 3 of the present invention.

Next, a zoom lens in Example 3 will be described. FIG. 4 is a cross section illustrating the lens configuration of the zoom lens in Example 3.

The shape of the zoom lens in Example 3 is also similar to that of the zoom lens in Example 1.

Table 9 shows basic lens data of the zoom lens in Example 3. Table 10 shows data about the specification of the zoom lens in Example 3. Table 11 shows data about moving surface distances. Table 12 shows data about aspheric surface coefficients. FIG. 10, Sections A through L illustrate aberration diagrams.

TABLE 9

EXAMPLE 3·LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 361.0022 | 1.72 | 1.83400 | 37.16 |
| 2 | 57.4644 | 6.31 | 1.48749 | 70.45 |
| 3 | −205.9569 | 0.10 | | |
| 4 | 56.5745 | 4.58 | 1.62299 | 58.16 |
| 5 | 718.2977 | DD[5] | | |

TABLE 9-continued

EXAMPLE 3·LENS DATA

| Si (SURFACE NUMBER) | Ri (CURVA- TURE RADIUS) | Di (SURFACE DISTANCE) | Ndj (REFRAC- TIVE INDEX) | vdj (ABBE NUMBER) |
|---|---|---|---|---|
| 6 | 74.3941 | 1.00 | 1.80610 | 40.92 |
| 7 | 11.4878 | 4.77 | | |
| 8 | −32.9963 | 1.04 | 1.70000 | 48.08 |
| 9 | 13.8771 | 3.90 | 1.92286 | 20.88 |
| 10 | 9055.0700 | 1.59 | | |
| 11 | −18.7387 | 0.85 | 1.80610 | 40.92 |
| 12 | −47.7835 | DD[12] | | |
| 13(STOP) | ∞ | 1.10 | | |
| 14 | 13.8757 | 5.50 | 1.49700 | 81.54 |
| 15 | −13.9368 | 1.14 | 1.72342 | 37.95 |
| 16 | −26.1506 | 0.28 | | |
| 17 | 43.4934 | 0.94 | 1.62280 | 57.05 |
| 18 | 11.3547 | 1.60 | 1.61772 | 49.81 |
| 19 | 16.2227 | 0.71 | | |
| *20 | 10.6067 | 2.19 | 1.56867 | 58.50 |
| *21 | 14.1215 | 4.16 | | |
| 22 | 20.3376 | 1.12 | 1.80000 | 29.84 |
| 23 | 11.3367 | 3.96 | 1.62299 | 58.16 |
| 24 | −102.9551 | DD[24] | | |
| 25 | 72.6764 | 1.49 | 1.83481 | 42.73 |
| 26 | 10.8923 | 0.34 | | |
| *27 | 11.3675 | 1.10 | 1.53388 | 55.37 |
| *28 | 14.7003 | DD[28] | | |
| *29 | −62.6237 | 2.27 | 1.53388 | 55.37 |
| *30 | −8.1441 | 1.10 | | |
| 31 | ∞ | 0.30 | 1.51680 | 64.20 |
| 32 | ∞ | 1.00 | | |
| 33 | ∞ | 0.50 | 1.51680 | 64.20 |
| 34 | ∞ | 3.54 | | |

TABLE 10

EXAMPLE 3·SPECIFICATION (d-LINE)

| | WIDE ANGLE | MIDDLE | TELEPHOTO |
|---|---|---|---|
| ZOOM RATIO | 1.0 | 11.9 | 39.3 |
| f' | 4.57 | 54.11 | 179.20 |
| FNo. | 2.92 | 5.39 | 5.88 |
| 2ω[°] | 93.2 | 8.2 | 2.4 |

TABLE 11

EXAMPLE 3·ZOOM DISTANCE

| | WIDE ANGLE | MIDDLE | TELEPHOTO |
|---|---|---|---|
| DD[5] | 0.65 | 62.67 | 82.42 |
| DD[12] | 45.08 | 8.63 | 0.92 |
| DD[24] | 2.45 | 14.47 | 21.75 |
| DD[28] | 2.83 | 12.83 | 14.35 |

TABLE 12

EXAMPLE 3·ASPHERIC SURFACE COEFFICIENT

| | SURFACE NUMBER | | |
|---|---|---|---|
| | 20 | 21 | 27 |
| KA | 1.0000000E+00 | 1.0000000E+00 | 1.0000000E+00 |
| A3 | −1.0285685E−04 | −9.0037351E−05 | −1.5208088E−03 |
| A4 | −3.8982432E−05 | 8.7105990E−05 | 3.0527655E−05 |
| A5 | −4.9670383E−06 | 1.9657291E−06 | 2.6146099E−05 |
| A6 | −4.7805455E−07 | −4.7027668E−07 | 4.5645075E−06 |
| A7 | −5.4577020E−08 | −9.3067990E−08 | 8.8588885E−07 |

TABLE 12-continued

EXAMPLE 3·ASPHERIC SURFACE COEFFICIENT

| A8 | −8.0271753E−09 | −1.1927503E−08 | 2.1426618E−07 |
|---|---|---|---|
| A9 | −1.3009312E−09 | −1.4421885E−09 | 2.9022714E−08 |
| A10 | −2.1049655E−10 | −1.8945011E−10 | 2.7013644E−08 |
| A11 | −3.3843134E−11 | −2.7030386E−11 | 2.2117300E−08 |
| A12 | −5.0616621E−12 | −4.3657345E−12 | −6.4019272E−10 |
| A13 | −6.6382243E−13 | −7.4382085E−13 | 2.7096283E−09 |
| A14 | −7.6052005E−14 | −1.2452942E−13 | −2.1496021E−10 |
| A15 | −5.9616895E−15 | −1.9285268E−14 | 9.7317506E−12 |
| A16 | 1.7431609E−16 | −2.9519487E−15 | −5.0244991E−11 |
| A17 | 1.8000251E−16 | −2.6006268E−16 | −1.0012218E−11 |
| A18 | 4.8600206E−17 | 1.6503937E−17 | 2.3951650E−12 |
| A19 | 9.5744337E−18 | 2.3407555E−17 | −4.8584527E−13 |
| A20 | 1.4241010E−18 | 8.5178573E−18 | −2.8072458E−14 |

| | SURFACE NUMBER | | |
|---|---|---|---|
| | 28 | 29 | 30 |
| KA | 1.0000000E+00 | 1.0000000E+00 | 1.0000000E+00 |
| A3 | −2.1424564E−03 | −9.1099959E−04 | −4.7088445E−04 |
| A4 | 3.0076799E−04 | −2.5366796E−04 | 2.2281618E−04 |
| A5 | 8.9021929E−06 | −1.4813466E−06 | 1.8222703E−05 |
| A6 | 6.7323579E−07 | 3.8786307E−06 | 1.0293731E−06 |
| A7 | 1.1167671E−06 | 7.3497087E−07 | 1.7697171E−07 |
| A8 | 7.1638180E−07 | 9.5946270E−08 | 3.8996376E−08 |
| A9 | 2.4350648E−07 | 1.1094994E−08 | 8.6711933E−09 |
| A10 | 5.7205671E−08 | 8.6793408E−10 | 1.4022719E−09 |
| A11 | 1.5829554E−08 | 6.9521025E−11 | 2.3180563E−10 |
| A12 | 4.4818099E−10 | 2.9694370E−12 | 3.7172669E−11 |
| A13 | −2.3850413E−09 | 9.6096544E−13 | 6.6078261E−12 |
| A14 | −1.1116823E−09 | 9.7802446E−13 | 1.0161997E−12 |
| A15 | 1.2812375E−10 | −7.4111276E−14 | 9.9742438E−14 |
| A16 | 2.0644620E−10 | −6.0544259E−15 | −1.3159336E−14 |
| A17 | −1.6535107E−11 | 9.6054575E−15 | 2.6469612E−15 |
| A18 | −1.8782477E−12 | 3.9252849E−16 | −4.4400095E−16 |
| A19 | −4.0096223E−12 | −2.2850622E−15 | −2.5495849E−16 |
| A20 | 5.6607126E−13 | 2.3172064E−16 | −8.7514818E−17 |

Figure 5:
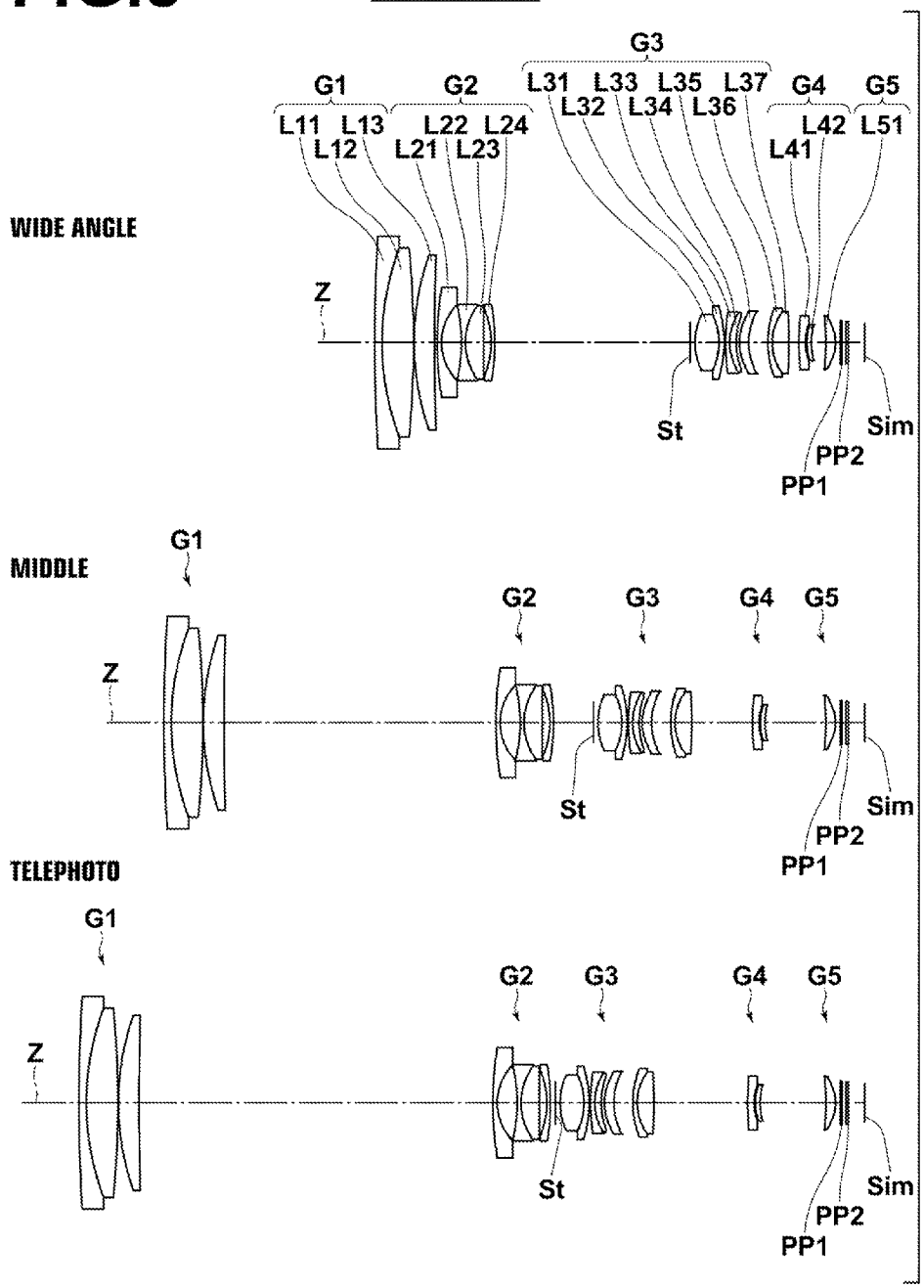
FIG. 5 is a cross section illustrating the lens configuration of a zoom lens in Example 4 of the present invention.

Next, a zoom lens in Example 4 will be described. FIG. 5 is a cross section illustrating the lens configuration of the zoom lens in Example 4.

The shape of the zoom lens in Example 4 is also similar to that of the zoom lens in Example 1.

Table 13 shows basic lens data of the zoom lens in Example 4. Table 14 shows data about the specification of the zoom lens in Example 4. Table 15 shows data about moving surface distances. Table 16 shows data about aspheric surface coefficients. FIG. 11, Sections A through L illustrate aberration diagrams.

TABLE 13

EXAMPLE 4·LENS DATA

| Si (SURFACE NUMBER) | Ri (CURVA- TURE RADIUS) | Di (SURFACE DISTANCE) | Ndj (REFRAC- TIVE INDEX) | vdj (ABBE NUMBER) |
|---|---|---|---|---|
| 1 | 369.5336 | 1.72 | 1.83400 | 37.16 |
| 2 | 57.3492 | 7.31 | 1.49700 | 81.54 |
| 3 | −206.6698 | 0.10 | | |
| 4 | 56.6857 | 4.77 | 1.62230 | 53.17 |
| 5 | 679.1503 | DD[5] | | |
| 6 | 74.3771 | 1.00 | 1.80610 | 40.92 |
| 7 | 11.6956 | 4.63 | | |
| 8 | −33.9767 | 0.91 | 1.72000 | 50.23 |
| 9 | 13.4760 | 4.22 | 1.92286 | 20.88 |
| 10 | 4864.0229 | 1.73 | | |
| 11 | −18.5327 | 0.85 | 1.80610 | 40.92 |
| 12 | −47.2029 | DD[12] | | |
| 13(STOP) | ∞ | 1.10 | | |
| 14 | 13.9062 | 5.54 | 1.49700 | 81.54 |
| 15 | −13.7154 | 1.19 | 1.72047 | 34.71 |

TABLE 13-continued

EXAMPLE 4•LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 16 | −26.3471 | 0.31 | | |
| 17 | 43.5076 | 0.99 | 1.62041 | 60.29 |
| 18 | 11.8107 | 1.51 | 1.60562 | 43.70 |
| 19 | 16.2431 | 0.72 | | |
| *20 | 10.6218 | 2.17 | 1.56867 | 58.50 |
| *21 | 14.0941 | 4.42 | | |
| 22 | 20.3355 | 1.01 | 1.80000 | 29.84 |
| 23 | 11.2613 | 3.86 | 1.62299 | 58.16 |
| 24 | −97.2295 | DD[24] | | |
| 25 | 72.2832 | 1.48 | 1.83481 | 42.73 |
| 26 | 10.8183 | 0.30 | | |
| *27 | 11.3883 | 1.10 | 1.53388 | 55.37 |
| *28 | 14.8632 | DD[28] | | |
| 29 | −74.5580 | 2.28 | 1.53388 | 55.37 |
| *30 | −8.0224 | 1.10 | | |
| 31 | ∞ | 0.30 | 1.51680 | 64.20 |
| 32 | ∞ | 1.00 | | |
| 33 | ∞ | 0.50 | 1.51680 | 64.20 |
| 34 | ∞ | 3.84 | | |

TABLE 14

EXAMPLE 4•SPECIFICATION (d-LINE)

| | WIDE ANGLE | MIDDLE | TELEPHOTO |
|---|---|---|---|
| ZOOM RATIO | 1.0 | 11.9 | 39.3 |
| f′ | 4.57 | 54.13 | 179.46 |
| FNo. | 2.88 | 5.27 | 5.88 |
| 2ω[°] | 93.0 | 8.2 | 2.4 |

TABLE 15

EXAMPLE 4•ZOOM DISTANCE

| | WIDE ANGLE | MIDDLE | TELEPHOTO |
|---|---|---|---|
| DD[5] | 0.59 | 62.96 | 81.96 |
| DD[12] | 45.29 | 9.21 | 1.12 |
| DD[24] | 2.35 | 14.10 | 21.72 |
| DD[28] | 3.32 | 14.06 | 15.24 |

TABLE 16

EXAMPLE 4•ASPHERIC SURFACE COEFFICIENT

| | SURFACE NUMBER | | |
|---|---|---|---|
| | 20 | 21 | 27 |
| KA | 1.0000000E+00 | 1.0000000E+00 | 1.0000000E+00 |
| A3 | −9.8356955E−05 | −8.8534469E−05 | −1.5390388E−03 |
| A4 | −3.8942797E−05 | 8.7172678E−05 | 1.3822707E−05 |
| A5 | −4.8623029E−06 | 1.6980402E−06 | 3.3571393E−05 |
| A6 | −4.7852415E−07 | −5.6186726E−07 | 6.1293832E−06 |
| A7 | −5.9830623E−08 | −1.0539465E−07 | 4.6543401E−07 |
| A8 | −9.0091216E−09 | −1.3617636E−08 | −2.2403130E−07 |
| A9 | −1.4476776E−09 | −1.6823185E−09 | −1.4873976E−07 |
| A10 | −2.3200777E−10 | −2.2317244E−10 | −3.1258885E−08 |
| A11 | −3.7096911E−11 | −3.1636240E−11 | 1.1717624E−08 |
| A12 | −5.5650454E−12 | −4.9730136E−12 | 1.7884137E−09 |
| A13 | −7.4233820E−13 | −8.2157980E−13 | 3.7571539E−09 |
| A14 | −8.8314441E−14 | −1.3370477E−13 | −6.5926582E−10 |
| A15 | −7.8612058E−15 | −2.0202671E−14 | −4.5382227E−10 |
| A16 | −1.0714459E−16 | −3.0405393E−15 | −7.5414918E−12 |
| A17 | 1.4240539E−16 | −2.6888394E−16 | 2.4120128E−11 |

TABLE 16-continued

EXAMPLE 4•ASPHERIC SURFACE COEFFICIENT

| A18 | 4.4387707E−17 | 1.3831449E−17 | 3.5972153E−12 |
|---|---|---|---|
| A19 | 9.3003898E−18 | 2.2563692E−17 | 5.8454345E−13 |
| A20 | 1.4845979E−18 | 8.1905445E−18 | −2.9641657E−13 |

| | SURFACE NUMBER | | |
|---|---|---|---|
| | 28 | 29 | 30 |
| KA | 1.0000000E+00 | 1.0000000E+00 | 1.0000000E+00 |
| A3 | −2.1143480E−03 | −8.8745771E−04 | −5.2431750E−04 |
| A4 | 3.2251786E−04 | −2.5444652E−04 | 1.9685271E−04 |
| A5 | −1.0281280E−06 | −3.0105811E−06 | 1.7425756E−05 |
| A6 | −1.8177923E−06 | 3.5190991E−06 | 1.7120366E−06 |
| A7 | 1.1040062E−06 | 7.2031868E−07 | 3.7475333E−07 |
| A8 | 7.9927833E−07 | 1.1260044E−07 | 7.4644302E−08 |
| A9 | 2.4158166E−07 | 1.7801320E−08 | 1.3324813E−08 |
| A10 | 2.1922079E−08 | 2.6461807E−09 | 1.8826036E−09 |
| A11 | −1.7632829E−08 | 3.9406290E−10 | 2.6481628E−10 |
| A12 | −1.1291169E−08 | 6.9285048E−11 | 3.8724429E−11 |
| A13 | −2.0518558E−09 | 1.4938714E−11 | 6.6406686E−12 |
| A14 | −6.2079835E−10 | 1.0319952E−12 | 1.5525336E−12 |
| A15 | −4.3988076E−11 | −5.8591493E−13 | 4.0277686E−13 |
| A16 | 3.2226370E−10 | −1.4031968E−13 | 1.2410671E−13 |
| A17 | −2.6643873E−11 | −6.2075007E−14 | −1.5433484E−15 |
| A18 | −7.1251351E−13 | 2.2020875E−14 | 4.8156440E−15 |
| A19 | −3.8221976E−12 | −1.1723770E−15 | −4.3220906E−16 |
| A20 | 6.9399359E−13 | −2.5082272E−16 | −4.2149317E−16 |

Figure 6:
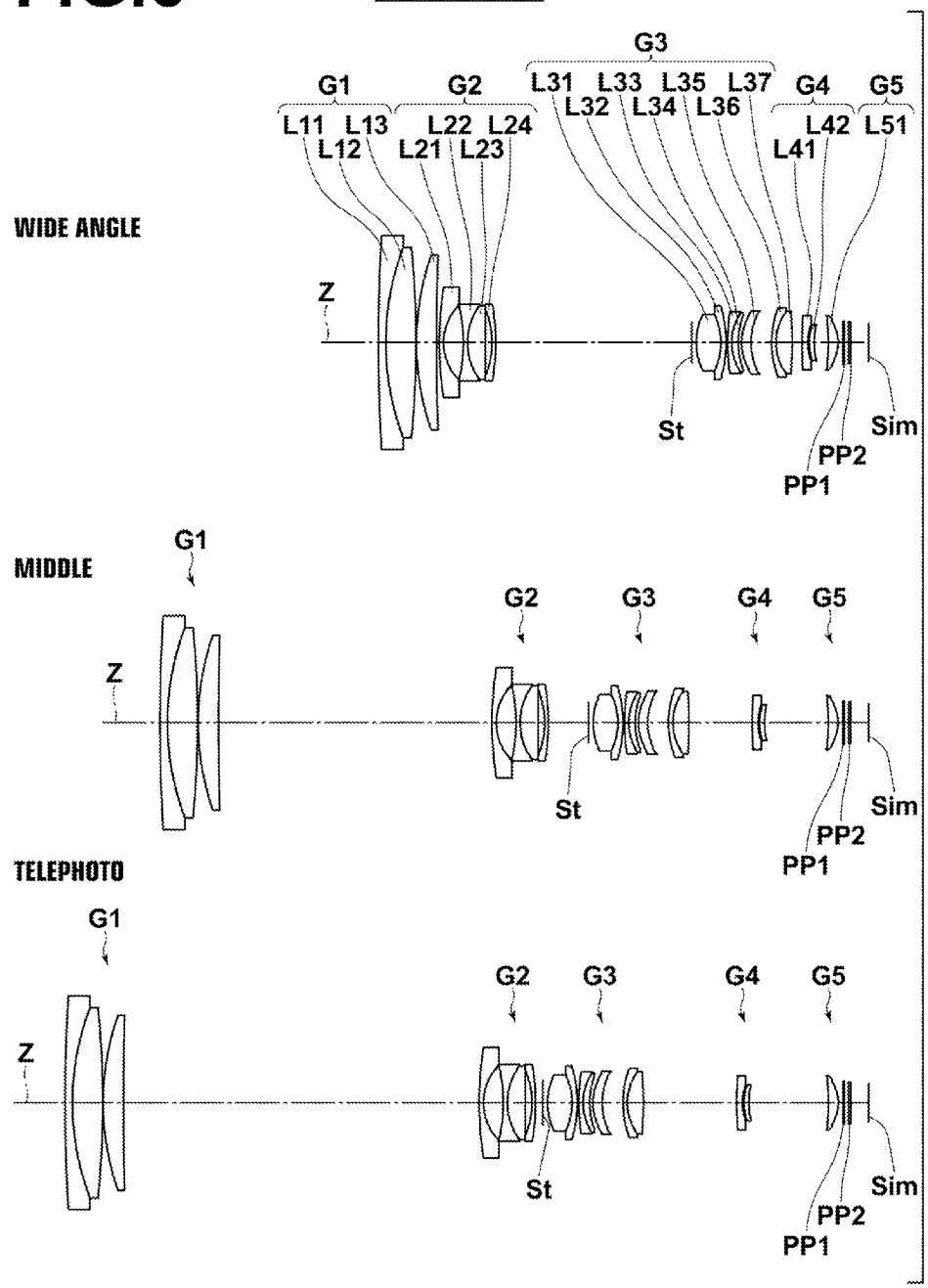
FIG. 6 is a cross section illustrating the lens configuration of a zoom lens in Example 5 of the present invention.

Next, a zoom lens in Example 5 will be described. FIG. 6 is a cross section illustrating the lens configuration of the zoom lens in Example 5.

The shape of the zoom lens in Example 5 is also similar to that of the zoom lens in Example 1.

Table 17 shows a basic lens data of the zoom lens in Example 5. Table 18 shows data about the specification of the zoom lens in Example 5. Table 19 shows data about moving surface distances. Table 20 shows data about aspheric surface coefficients. FIG. 12, Sections A through L illustrate aberration diagrams.

TABLE 17

EXAMPLE 5•LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 370.4649 | 1.72 | 1.83400 | 37.16 |
| 2 | 57.3016 | 6.94 | 1.49700 | 81.54 |
| 3 | −207.1628 | 0.10 | | |
| 4 | 56.7144 | 4.68 | 1.62230 | 53.17 |
| 5 | 674.7933 | DD[5] | | |
| 6 | 75.6037 | 1.00 | 1.80610 | 40.92 |
| 7 | 11.6752 | 4.54 | | |
| 8 | −33.8318 | 0.95 | 1.72000 | 50.23 |
| 9 | 13.4288 | 4.13 | 1.92286 | 20.88 |
| 10 | 8718.7226 | 1.51 | | |
| 11 | −18.5063 | 0.85 | 1.80610 | 40.92 |
| 12 | −47.3002 | DD[12] | | |
| 13(STOP) | ∞ | 1.10 | | |
| 14 | 13.9130 | 5.66 | 1.49700 | 81.54 |
| 15 | −13.6889 | 1.20 | 1.72047 | 34.71 |
| 16 | −26.4080 | 0.33 | | |
| 17 | 43.7670 | 0.98 | 1.62041 | 60.29 |
| 18 | 11.6728 | 1.50 | 1.60562 | 43.70 |
| 19 | 16.2134 | 0.75 | | |
| *20 | 10.6726 | 2.16 | 1.56867 | 58.50 |
| *21 | 14.0720 | 4.75 | | |
| 22 | 20.3818 | 1.01 | 1.80000 | 29.84 |
| 23 | 11.2413 | 3.69 | 1.62299 | 58.16 |
| 24 | −99.6335 | DD[24] | | |
| 25 | 70.7466 | 1.36 | 1.83481 | 42.73 |

TABLE 17-continued

EXAMPLE 5•LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 26 | 10.8968 | 0.34 | | |
| *27 | 11.2407 | 1.13 | 1.53388 | 55.37 |
| *28 | 15.1707 | DD[28] | | |
| *29 | −71.8004 | 2.27 | 1.53388 | 55.37 |
| *30 | −8.0324 | 1.10 | | |
| 31 | ∞ | 0.30 | 1.51680 | 64.20 |
| 32 | ∞ | 1.00 | | |
| 33 | ∞ | 0.50 | 1.51680 | 64.20 |
| 34 | ∞ | 4.13 | | |

TABLE 18

EXAMPLE 5•SPECIFICATION (d-LINE)

| | WIDE ANGLE | MIDDLE | TELEPHOTO |
|---|---|---|---|
| ZOOM RATIO | 1.0 | 11.9 | 39.3 |
| f | 4.57 | 54.20 | 179.72 |
| FNo. | 2.88 | 5.32 | 5.88 |
| 2ω[°] | 93.4 | 8.2 | 2.4 |

TABLE 19

EXAMPLE 5•ZOOM DISTANCE

| | WIDE ANGLE | MIDDLE | TELEPHOTO |
|---|---|---|---|
| DD[5] | 0.59 | 62.97 | 81.89 |
| DD[12] | 45.09 | 9.22 | 1.66 |
| DD[24] | 2.28 | 14.55 | 21.49 |
| DD[28] | 3.25 | 14.71 | 18.31 |

TABLE 20

EXAMPLE 5•ASPHERIC SURFACE COEFFICIENT

| | SURFACE NUMBER | | |
|---|---|---|---|
| | 20 | 21 | 27 |
| KA | 1.0000000E+00 | 1.0000000E+00 | 1.0000000E+00 |
| A3 | −9.8353457E−05 | −8.8531198E−05 | −1.5401326E−03 |
| A4 | −3.8908503E−05 | 8.7129943E−05 | 1.1029563E−05 |
| A5 | −4.8435319E−06 | 1.6637777E−06 | 3.2681668E−05 |
| A6 | −4.7551595E−07 | −5.7154208E−07 | 5.9538494E−06 |
| A7 | −5.9598618E−08 | −1.0635476E−07 | 4.8147506E−07 |
| A8 | −8.9441479E−09 | −1.3714200E−08 | −1.8356473E−07 |
| A9 | −1.4335810E−09 | −1.6915105E−09 | −1.2705129E−07 |
| A10 | −2.2965010E−10 | −2.2366607E−10 | −2.1991457E−08 |
| A11 | −3.6764781E−11 | −3.1553497E−11 | 1.4103482E−08 |
| A12 | −5.5252056E−12 | −4.9338472E−12 | 1.1889837E−09 |
| A13 | −7.3860810E−13 | −8.1139305E−13 | 3.7119018E−09 |
| A14 | −8.8172604E−14 | −1.3152966E−13 | −7.6367045E−10 |
| A15 | −7.9102888E−15 | −1.9790632E−14 | −5.7293984E−10 |
| A16 | −1.2525697E−16 | −2.9699687E−15 | −1.3930255E−11 |
| A17 | 1.3818873E−16 | −2.5819949E−16 | 3.0119796E−11 |
| A18 | 4.3571291E−17 | 1.5149153E−17 | 3.4869346E−12 |
| A19 | 9.1650350E−18 | 2.2644056E−17 | 8.1567303E−13 |
| A20 | 1.4657225E−18 | 8.1695582E−18 | −2.6240299E−13 |

| | SURFACE NUMBER | | |
|---|---|---|---|
| | 28 | 29 | 30 |
| KA | 1.0000000E+00 | 1.0000000E+00 | 1.0000000E+00 |
| A3 | −2.1134099E−03 | −8.6223722E−04 | −5.3676026E−04 |

TABLE 20-continued

EXAMPLE 5•ASPHERIC SURFACE COEFFICIENT

| A4 | 3.2129436E−04 | −2.5199644E−04 | 1.9442788E−04 |
|---|---|---|---|
| A5 | −2.5189307E−06 | −3.2599109E−06 | 1.7572390E−05 |
| A6 | −2.4334986E−06 | 3.4264599E−06 | 1.8141103E−06 |
| A7 | 8.5801938E−07 | 7.0414747E−07 | 3.9735857E−07 |
| A8 | 7.0919489E−07 | 1.1055901E−07 | 7.8145776E−08 |
| A9 | 2.1838579E−07 | 1.7607812E−08 | 1.3744554E−08 |
| A10 | 2.1255867E−08 | 2.6377927E−09 | 1.9145356E−09 |
| A11 | −1.6708732E−08 | 3.9546135E−10 | 2.6386758E−10 |
| A12 | −1.0146648E−08 | 6.9800845E−11 | 3.7538497E−11 |
| A13 | −1.8134292E−09 | 1.5023691E−11 | 6.3207538E−12 |
| A14 | −7.5850357E−10 | 1.0350411E−12 | 1.4844668E−12 |
| A15 | −2.1604898E−11 | −5.8745169E−13 | 3.8906232E−13 |
| A16 | 2.9968841E−10 | −1.4129467E−13 | 1.2206048E−13 |
| A17 | −2.4820132E−11 | −6.2377785E−14 | −1.8306086E−15 |
| A18 | −6.9851771E−13 | 2.1930359E−14 | 4.7720936E−15 |
| A19 | −3.7034984E−12 | −1.1840092E−15 | −4.3522680E−16 |
| A20 | 6.7297844E−13 | −2.5394124E−16 | −4.2224351E−16 |

Figure 7:
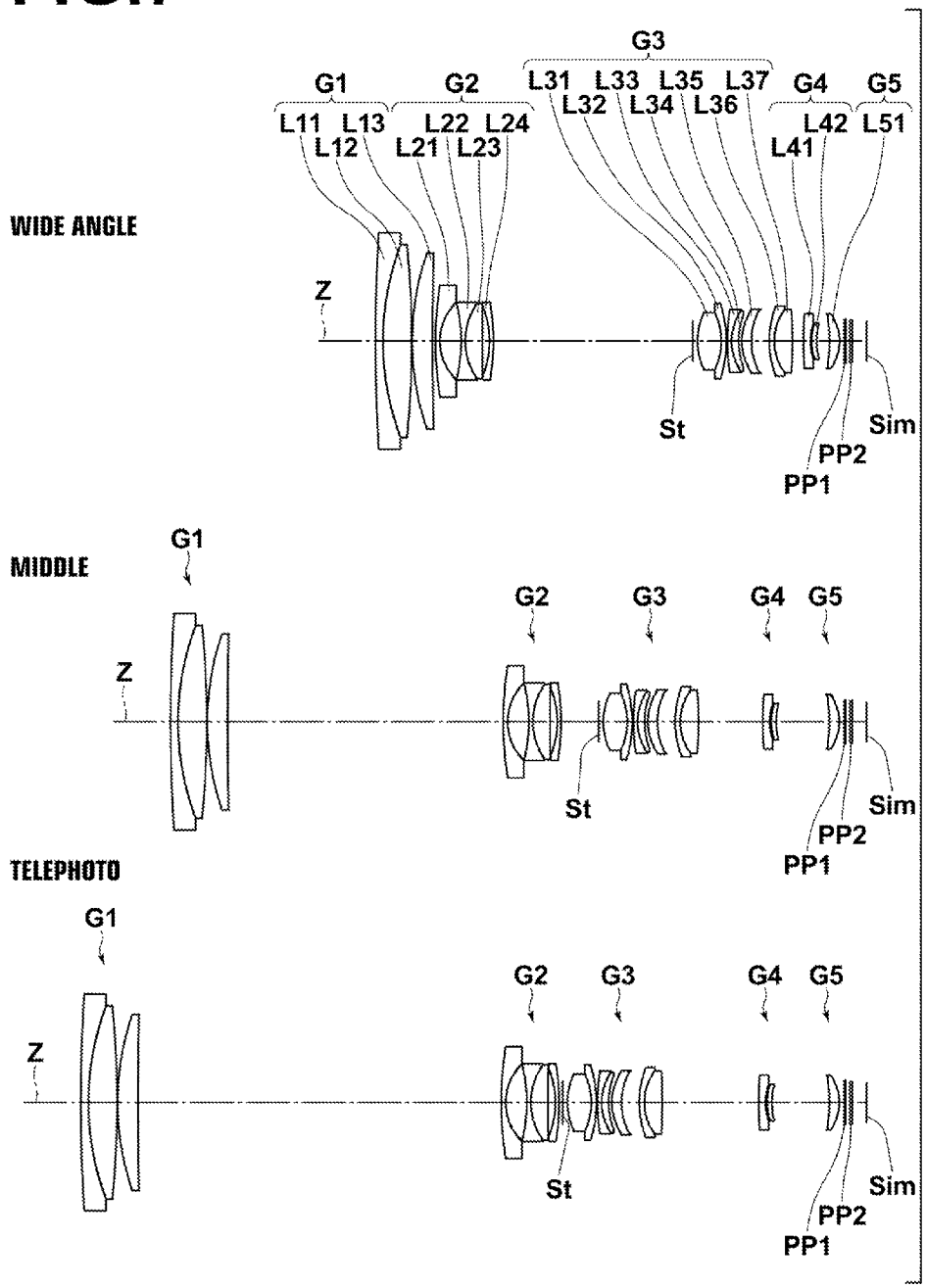
FIG. 7 is a cross section illustrating the lens configuration of a zoom lens in Example 6 of the present invention.

Next, a zoom lens in Example 6 will be described. FIG. 7 is a cross section illustrating the lens configuration of the zoom lens in Example 6.

The shape of the zoom lens in Example 6 is also similar to that of the zoom lens in Example 1.

Table 21 shows basic lens data of the zoom lens Example 6. Table 22 data about the specification of the zoom lens in Example 6. Table 23 shows data about moving surface distances. Table 24 shows data about aspheric surface coefficients. FIG. 13, Sections A through L illustrate aberration diagrams.

TABLE 21

EXAMPLE 6•LENS DATA

| Si (SURFACE NUMBER) | Ri (CURVATURE RADIUS) | Di (SURFACE DISTANCE) | Ndj (REFRACTIVE INDEX) | vdj (ABBE NUMBER) |
|---|---|---|---|---|
| 1 | 360.5465 | 1.72 | 1.83400 | 37.16 |
| 2 | 57.4902 | 6.51 | 1.48749 | 70.45 |
| 3 | −205.7052 | 0.10 | | |
| 4 | 56.5600 | 4.62 | 1.62299 | 58.16 |
| 5 | 720.8243 | DD[5] | | |
| 6 | 73.9324 | 1.00 | 1.80610 | 40.92 |
| 7 | 11.4908 | 4.81 | | |
| 8 | −33.0560 | 0.95 | 1.70000 | 48.08 |
| 9 | 13.9326 | 3.90 | 1.92286 | 20.88 |
| 10 | 5958.0760 | 1.63 | | |
| 11 | −18.7130 | 0.85 | 1.80610 | 40.92 |
| 12 | −47.9759 | DD[12] | | |
| 13(STOP) | ∞ | 1.10 | | |
| 14 | 13.8725 | 5.42 | 1.49700 | 81.54 |
| 15 | −13.9438 | 1.13 | 1.72342 | 37.95 |
| 16 | −26.1254 | 0.26 | | |
| 17 | 43.3747 | 0.95 | 1.62280 | 57.05 |
| 18 | 11.3632 | 1.60 | 1.61772 | 49.81 |
| 19 | 16.2366 | 0.70 | | |
| *20 | 10.6051 | 2.20 | 1.56867 | 58.50 |
| *21 | 14.1318 | 4.04 | | |
| 22 | 20.3139 | 1.16 | 1.80000 | 29.84 |
| 23 | 11.3462 | 4.08 | 1.62299 | 58.16 |
| 24 | −101.8691 | DD[24] | | |
| 25 | 72.8808 | 1.57 | 1.83481 | 42.73 |
| 26 | 10.8749 | 0.34 | | |
| *27 | 11.4133 | 1.12 | 1.53388 | 55.37 |
| *28 | 14.5950 | DD[28] | | |
| *29 | −66.5333 | 2.32 | 1.58313 | 59.46 |
| *30 | −8.8892 | 1.10 | | |
| 31 | ∞ | 0.30 | 1.51680 | 64.20 |
| 32 | ∞ | 1.00 | | |
| 33 | ∞ | 0.50 | 1.51680 | 64.20 |
| 34 | ∞ | 3.25 | | |

TABLE 22

EXAMPLE 6·SPECIFICATION (d-LINE)

|  | WIDE ANGLE | MIDDLE | TELEPHOTO |
|---|---|---|---|
| ZOOM RATIO | 1.0 | 11.9 | 39.3 |
| f' | 4.57 | 54.09 | 179.04 |
| FNo. | 2.93 | 5.36 | 5.88 |
| 2ω[°] | 93.2 | 8.2 | 2.4 |

TABLE 23

EXAMPLE 6·ZOOM DISTANCE

|  | WIDE ANGLE | MIDDLE | TELEPHOTO |
|---|---|---|---|
| DD[5] | 0.69 | 62.56 | 82.49 |
| DD[12] | 45.22 | 8.50 | 0.79 |
| DD[24] | 2.50 | 14.66 | 21.86 |
| DD[28] | 2.87 | 12.03 | 12.98 |

TABLE 24

EXAMPLE 6·ASPHERIC SURFACE COEFFICIENT

| SURFACE NUMBER | | | |
|---|---|---|---|
|  | 20 | 21 | 27 |
| KA | 1.0000000E+00 | 1.0000000E+00 | 1.0000000E+00 |
| A3 | −1.0290192E−04 | −8.9837016E−05 | −1.5204232E−03 |
| A4 | −3.9097074E−05 | 8.7246303E−05 | 3.4820613E−05 |
| A5 | −5.0059629E−06 | 2.0154425E−06 | 2.8780436E−05 |
| A6 | −4.8303815E−07 | −4.6363160E−07 | 5.2336790E−06 |
| A7 | −5.4525049E−08 | −9.2961521E−08 | 1.0432147E−06 |
| A8 | −7.9579979E−09 | −1.1983662E−08 | 2.5602011E−07 |
| A9 | −1.2869047E−09 | −1.4555528E−09 | 3.7684683E−08 |
| A10 | −2.0828409E−10 | −1.9171692E−10 | 3.2212264E−08 |
| A11 | −3.3534724E−11 | −2.7362533E−11 | 2.2347938E−08 |
| A12 | −5.0225242E−12 | −4.4091108E−12 | 1.2926950E−10 |
| A13 | −6.5948556E−13 | −7.4860630E−13 | 2.4258114E−09 |
| A14 | −7.5720085E−14 | −1.2484761E−13 | 1.2482844E−11 |
| A15 | −5.9692449E−15 | −1.9243676E−14 | −4.7171276E−11 |
| A16 | 1.6244058E−16 | −2.9273019E−15 | −6.1090153E−11 |
| A17 | 1.7648671E−16 | −2.5315382E−16 | −1.2866112E−11 |
| A18 | 4.7738137E−17 | 1.8616303E−17 | 3.1443332E−12 |
| A19 | 9.3626638E−18 | 2.3890326E−17 | −2.5066702E−13 |
| A20 | 1.3840083E−18 | 8.5871749E−18 | 3.9794107E−14 |

| SURFACE NUMBER | | | |
|---|---|---|---|
|  | 28 | 29 | 30 |
| KA | 1.0000000E+00 | 1.0000000E+00 | 1.0000000E+00 |
| A3 | −2.1433189E−03 | −8.7264011E−04 | −5.4877605E−04 |
| A4 | 2.9453729E−04 | −2.4336160E−04 | 2.1068272E−04 |
| A5 | 7.2800759E−06 | 2.8493984E−07 | 1.6682929E−05 |

TABLE 24-continued

EXAMPLE 6·ASPHERIC SURFACE COEFFICIENT

| A6 | 9.8162289E−07 | 4.1822537E−06 | 8.3112576E−07 |
|---|---|---|---|
| A7 | 1.4412164E−06 | 7.8610592E−07 | 1.5195676E−07 |
| A8 | 8.5398062E−07 | 1.0433618E−07 | 3.6111530E−08 |
| A9 | 2.9214680E−07 | 1.2427869E−08 | 8.3896379E−09 |
| A10 | 7.0134518E−08 | 1.0612500E−09 | 1.3946980E−09 |
| A11 | 1.7257234E−08 | 9.2468026E−11 | 2.3624724E−10 |
| A12 | 1.1372645E−09 | 5.4140310E−12 | 3.9137266E−11 |
| A13 | −2.6609840E−09 | 5.9300139E−13 | 7.4854595E−12 |
| A14 | −1.2212398E−09 | 8.3541170E−13 | 1.1955806E−12 |
| A15 | 1.0867679E−10 | −1.0513412E−13 | 1.2903409E−13 |
| A16 | 2.0369850E−10 | −1.8650985E−14 | −9.9031547E−15 |
| A17 | −1.5844639E−11 | 1.1657651E−14 | 2.7170589E−15 |
| A18 | −1.2358791E−12 | −1.1533477E−15 | −9.3945978E−16 |
| A19 | −3.9936407E−12 | −2.9186071E−15 | −4.9473706E−16 |
| A20 | 6.1993650E−13 | 2.6775770E−16 | −1.4267492E−16 |

Table 25 shows values corresponding to conditional expressions (1) through (6) for the zoom lenses in Examples 1 through 6. In all of the examples, d-line is a reference wavelength. The following Table 25 shows values at this reference wavelength.

TABLE 25

| EXPRESSION NUMBER | CONDITIONAL EXPRESSION | EXAMPLE 1 | EXAMPLE 2 | EXAMPLE 3 | EXAMPLE 4 | EXAMPLE 5 | EXAMPLE 6 |
|---|---|---|---|---|---|---|---|
| (1) | |D1|/|D4| | 5.728 | 5.218 | 5.938 | 5.746 | 4.790 | 6.610 |
| (2) | |f5|/ft | 0.094 | 0.096 | 0.096 | 0.093 | 0.093 | 0.097 |
| (3) | f3o/f3i | 0.649 | 0.645 | 0.654 | 0.665 | 0.661 | 0.656 |
| (4) | |D4|/|f4| | 0.668 | 0.684 | 0.623 | 0.647 | 0.785 | 0.553 |
| (5) | |f4|/|f5| | 1.084 | 1.144 | 1.069 | 1.107 | 1.147 | 1.055 |
| (6) | |f4|/ft | 0.102 | 0.110 | 0.103 | 0.103 | 0.107 | 0.102 |

As these data show, all of the zoom lenses in Examples 1 through 6 satisfy conditional expressions (1) through (6). It is recognizable that the size of the zoom lenses is small, and various aberrations are excellently corrected through the entire variable magnification range while the zoom lenses have high variable magnification ratios.

Figure 14:
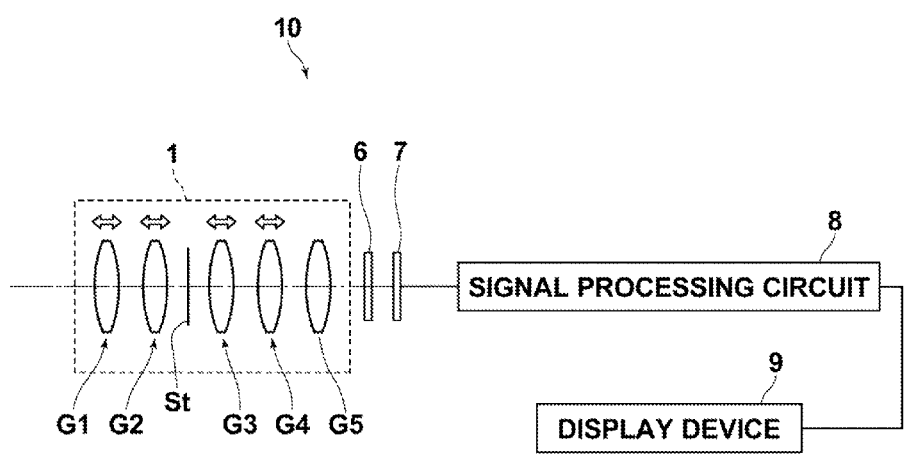
FIG. 14 is a schematic diagram illustrating the configuration of an imaging apparatus according to an embodiment of the present invention.

Next, an imaging apparatus according to an embodiment of the present invention will be described. FIG. 14 is a schematic diagram illustrating the configuration of an imaging apparatus using a zoom lens according to an embodiment of the present invention, as an example of an imaging apparatus according to an embodiment of the present invention. In FIG. 14, each lens group is schematically illustrated. This imaging apparatus is, for example, a video camera, an electronic still camera or the like using a solid state imaging device as a CCD and a CMOS, as a recording medium.

An imaging apparatus 10 illustrated in FIG. 14 includes a zoom lens 1, a filter 6 having a function of a low-pass filter or the like, and which is arranged toward the image side of the zoom lens 1, an imaging device 7 arranged toward the image side of the filter 6, and a signal processing circuit 8. The imaging device 7 converts an optical image formed by the zoom lens 1 into electrical signals. For example, a CCD (Charge Coupled Device), a CMOS (Complementary Metal Oxide Semiconductor) or the like may be used as the imaging device 7. The imaging device 7 is arranged in such a manner that an imaging surface of the imaging device 7 is matched with the image plane of the zoom lens 1.

An image imaged by the zoom lens 1 is formed on the imaging surface of the imaging device 7, and signals about the image are output from the imaging device 7. Operation processing is performed on the output signals at a signal processing circuit 8, and an image is displayed on a display device 9.

So far, the present invention has been describe by using embodiments and examples. However, the present invention is not limited to the aforementioned embodiments nor examples, and various modifications are possible. For example, the values of a curvature radius, a distance between surfaces, a refractive index, an Abbe number and the like of each lens element are not limited to the values in the aforementioned numerical value examples, and may be other values.

What is claimed is:

1. A zoom lens consisting of:
a first lens group having positive refractive power;
a second lens group having negative refractive power;
a third lens group having positive refractive power;
a fourth lens group having negative refractive power; and
a fifth lens group having positive refractive power in this order from an object side,
wherein the third lens group includes a cemented lens closest to the object side and a cemented lens closest to an image side, and
wherein the fourth lens group consists of a negative lens and a positive lens in this order from the object side, and
wherein distances between the lens groups change, and the fifth lens group is fixed, and at least the first lens group and the fourth lens group move when magnification is changed from the wide angle end to the telephoto end, and
wherein the following conditional expression is satisfied:

$$0.4 < f3o/f3i < 0.9 \qquad (3), \text{where}$$

f3o: a focal length of the cemented lens closest to the object side in the third lens group, and
f3i: a focal length of the cemented lens closest to the image side in the third lens group.

2. The zoom lens, as defined in claim 1, wherein an aperture stop is arranged at a position next to the cemented lens closest to the object side in the third lens group.

3. The zoom lens, as defined in claim 1, wherein the first lens group and the fourth lens group are located closer to the object side at a telephoto end than their positions at a wide angle end, respectively, and
wherein the following conditional expression is satisfied:

$$2.0 < |D1|/|D4| < 8.0 \qquad (1), \text{where}$$

D1: a difference between a position of the first lens group at the wide angle end and a position of the first lens group at the telephoto end on an optical axis, and
D4: a difference between a position of the fourth lens group at the wide angle end and a position of the fourth lens group at the telephoto end on an optical axis.

4. The zoom lens, as defined in claim 1, wherein the following conditional expression is satisfied:

$$0.05 < |f5|/ft < 0.20 \qquad (2), \text{where}$$

f5: a focal length of the fifth lens group, and
ft: a focal length of an entire system at the telephoto end.

5. The zoom lens, as defined in claim 1, wherein an image formation position is changed by moving, in a direction perpendicular to an optical axis, the whole third lens group or a part of lens groups included in the third lens group.

6. The zoom lens, as defined in claim 1, wherein an image formation position is changed by moving, in a direction perpendicular to an optical axis, the cemented lens closest to the image side in the third lens group.

7. The zoom lens, as defined in claim 1, wherein the following conditional expression is satisfied:

$$0.30 < |D4|/|f4| < 1.00 \qquad (4), \text{where}$$

D4: a difference between a position of the fourth lens group at the wide angle end and a position of the fourth lens group at the telephoto end on an optical axis, and
f4: a focal length of the fourth lens group.

8. The zoom lens, as defined in claim 1, wherein the following conditional expression is satisfied:

$$0.80 < |f4|/|f5| < 1.40 \qquad (5), \text{where}$$

f4: a focal length of the fourth lens group, and
f5: a focal length of the fifth lens group.

9. The zoom lens, as defined in claim 1, wherein the following conditional expression is satisfied:

$$0.05 < |f4|/ft < 0.18 \qquad (6), \text{where}$$

f4: a focal length of the fourth lens group, and
ft: a focal length of an entire system at the telephoto end.

10. The zoom lens, as defined in claim 1, wherein focusing is performed by moving the fourth lens group in an optical axis direction.

11. The zoom lens, as defined in claim 1, wherein the second lens group and the third lens group move when magnification is changed from the wide angle end to the telephoto end.

12. The zoom lens, as defined in claim 1, wherein the fifth lens group consists of a positive lens with its convex surface facing the image side.

13. The zoom lens, as defined in claim 1, wherein the first lens group and the fourth lens group are located closer to the object side at a telephoto end than their positions at a wide angle end, respectively, and
wherein the following conditional expression is satisfied:

$$4.0 < |D1|/|D4| < 7.5 \qquad (1\text{-}1), \text{where}$$

D1: a difference between a position of the first lens group at the wide angle end and a position of the first lens group at the telephoto end on an optical axis, and
D4: a difference between a position of the fourth lens group at the wide angle end and a position of the fourth lens group at the telephoto end on an optical axis.

14. The zoom lens, as defined in claim 1, wherein the first lens group and the fourth lens group are located closer to the object side at a telephoto end than their positions at a wide angle end, respectively, and
wherein the following conditional expression is satisfied:

$$4.5 < |D1|/|D4| < 7.0 \qquad (1\text{-}2), \text{where}$$

D1: a difference between a position of the first lens group at the wide angle end and a position of the first lens group at the telephoto end on an optical axis, and
D4: a difference between a position of the fourth lens group at the wide angle end and a position of the fourth lens group at the telephoto end on an optical axis.

15. The zoom lens, as defined in claim 1, wherein the following conditional expression is satisfied:

$$0.07 < |f5|/ft < 0.11 \qquad (2\text{-}1), \text{where}$$

f5: a focal length of the fifth lens group, and
ft: a focal length of an entire system at the telephoto end.

16. The zoom lens, as defined in claim 1, wherein the following conditional expression is satisfied:

$$0.09 < |f5|/ft < 0.10 \qquad (2\text{-}2), \text{where}$$

f5: a focal length of the fifth lens group, and ft: a focal length of an entire system at the telephoto end.

17. The zoom lens, as defined in claim 1, wherein the following conditional expression is satisfied:

$$0.5 < f3o/f3i < 0.8 \qquad (3\text{-}1), \text{ where}$$

f3o: a focal length of the cemented lens closest to the object side in the third lens group, and f3i: a focal length of the cemented lens closest to the image side in the third lens group.

18. An imaging apparatus, comprising the zoom lens, as defined in claim 1.

19. A zoom lens consisting of:
a first lens group having positive refractive power;
a second lens group having negative refractive power;
a third lens group having positive refractive power;
a fourth lens group having negative refractive power; and
a fifth lens group having positive refractive power in this order from an object side, wherein the third lens group includes a cemented lens closest to the object side and a cemented lens closest to an image side, wherein the fourth lens group consists of a negative lens and a positive lens in this order from the object side, wherein distances between the lens groups change, and the fifth lens group is fixed, and at least the first lens group and the fourth lens group move when magnification is changed from the wide angle end to the telephoto end, and wherein the third lens group consists of an aperture stop, the cemented lens of a positive lens and a negative lens, a cemented lens of a negative lens and a positive lens, a positive lens and the cemented lens of a negative lens and a positive lens in this order from the object side.

* * * * *